United States Patent
Das Sharma et al.

(10) Patent No.: US 12,505,065 B2
(45) Date of Patent: Dec. 23, 2025

(54) ON-PACKAGE DIE-TO-DIE (D2D) INTERCONNECT FOR MEMORY USING UNIVERSAL CHIPLET INTERCONNECT EXPRESS (UCIE) PHY

(71) Applicant: Intel Corporation, Santa Clara, CA (US)

(72) Inventors: Debendra Das Sharma, Saratoga, CA (US); Narasimha Lanka, Dublin, CA (US); Peter Onufryk, Flanders, NJ (US); Swadesh Choudhary, Mountain View, CA (US); Gerald Pasdast, San Jose, CA (US); Zuoguo Wu, San Jose, CA (US); Dimitrios Ziakas, Portland, OR (US); Sridhar Muthrasanallur, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/399,463

(22) Filed: Dec. 28, 2023

(65) Prior Publication Data
US 2024/0311330 A1 Sep. 19, 2024

Related U.S. Application Data

(63) Continuation of application No. PCT/US2023/024261, filed on Jun. 2, 2023.

(30) Foreign Application Priority Data

Mar. 18, 2023 (IN) .............................. 202341018509

(51) Int. Cl.
*G06F 13/42* (2006.01)
*G06F 13/16* (2006.01)
*G06F 13/40* (2006.01)

(52) U.S. Cl.
CPC ...... *G06F 13/4295* (2013.01); *G06F 13/1689* (2013.01); *G06F 2213/0038* (2013.01); *G06F 2213/0064* (2013.01)

(58) Field of Classification Search
CPC ............. G06F 13/4295; G06F 13/1689; G06F 2213/0038; G06F 2213/0064;
(Continued)

(56) References Cited

U.S. PATENT DOCUMENTS 5,983,328 A * 11/1999 Potts .................... G06F 13/1647
711/150
7,624,157 B2 * 11/2009 David ..................... H04L 49/90
709/215

(Continued)

OTHER PUBLICATIONS

International Search Report and Written Opinion for International Application No. PCT/US2023/024261, mailed Dec. 7, 2023, 9 pages.

*Primary Examiner* — Idriss N Alrobaye
*Assistant Examiner* — Henry W Yu
(74) *Attorney, Agent, or Firm* — KDW FIRM PLLC

(57) ABSTRACT

Embodiments described herein may include apparatus, systems, techniques, or processes that are directed to on-package die-to-die (D2D) interconnects. Specifically, embodiments herein may relate to on-package D2D interconnects for memory that use or relate to the Universal Chiplet Interconnect Express (UCIe) adapter or physical layer (PHY). Other embodiments are described and claimed.

20 Claims, 18 Drawing Sheets

(58) Field of Classification Search
CPC ............. G06F 13/1668; G06F 13/4004; G06F 13/4247; G06F 13/4265; G06F 13/4282
USPC .................................... 710/30, 62, 106, 315
See application file for complete search history.

(56) References Cited

U.S. PATENT DOCUMENTS

| | | | |
|---|---|---|---|
| 7,979,774 B1* | 7/2011 | Varnica | H03M 13/1102 |
| | | | 714/704 |
| 11,669,474 B1* | 6/2023 | Lee | G06F 1/10 |
| | | | 710/11 |
| 2002/0089923 A1* | 7/2002 | Yoshida | H04L 27/2615 |
| | | | 370/344 |
| 2004/0044833 A1 | 3/2004 | Ryan | |
| 2016/0283428 A1 | 9/2016 | Guddeti | |
| 2017/0060788 A1* | 3/2017 | Chang | G06F 13/1668 |
| 2021/0183415 A1* | 6/2021 | Shiah | G11C 7/1087 |
| 2021/0390179 A1* | 12/2021 | Hahn | G06F 21/602 |
| 2022/0222194 A1 | 7/2022 | Chandwani | |
| 2023/0031310 A1 | 2/2023 | Ipek | |
| 2023/0042288 A1 | 2/2023 | Zmudzinski | |
| 2024/0028208 A1* | 1/2024 | Kim | G06F 13/1684 |

\* cited by examiner

ND-PACKAGE DIE-TO-DIE (D2D) INTERCONNECT FOR MEMORY USING UNIVERSAL CHIPLET INTERCONNECT EXPRESS (UCIE) PHY

CROSS-REFERENCE TO RELATED APPLICATIONS

This application is a continuation of PCT Application Serial Number PCT/US23/24261, filed Jun. 2, 2023, entitled "ON-PACKAGE DIE-TO-DIE (D2D) INTERCONNECT FOR MEMORY USING UNIVERSAL CHIPLET INTERCONNECT EXPRESS (UCIE) PHY" which is an international application of, and claims the benefit of and priority to, previously filed India patent application Ser. No. 20/234, 1018509 filed Mar. 18, 2023, entitled "ON-PACKAGE DIE-TO-DIE (D2D) INTERCONNECT FOR MEMORY USING UNIVERSAL CHIPLET INTERCONNECT EXPRESS (UCIE) PHY," the contents of which are hereby incorporated by reference in their entireties.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (e.g., server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
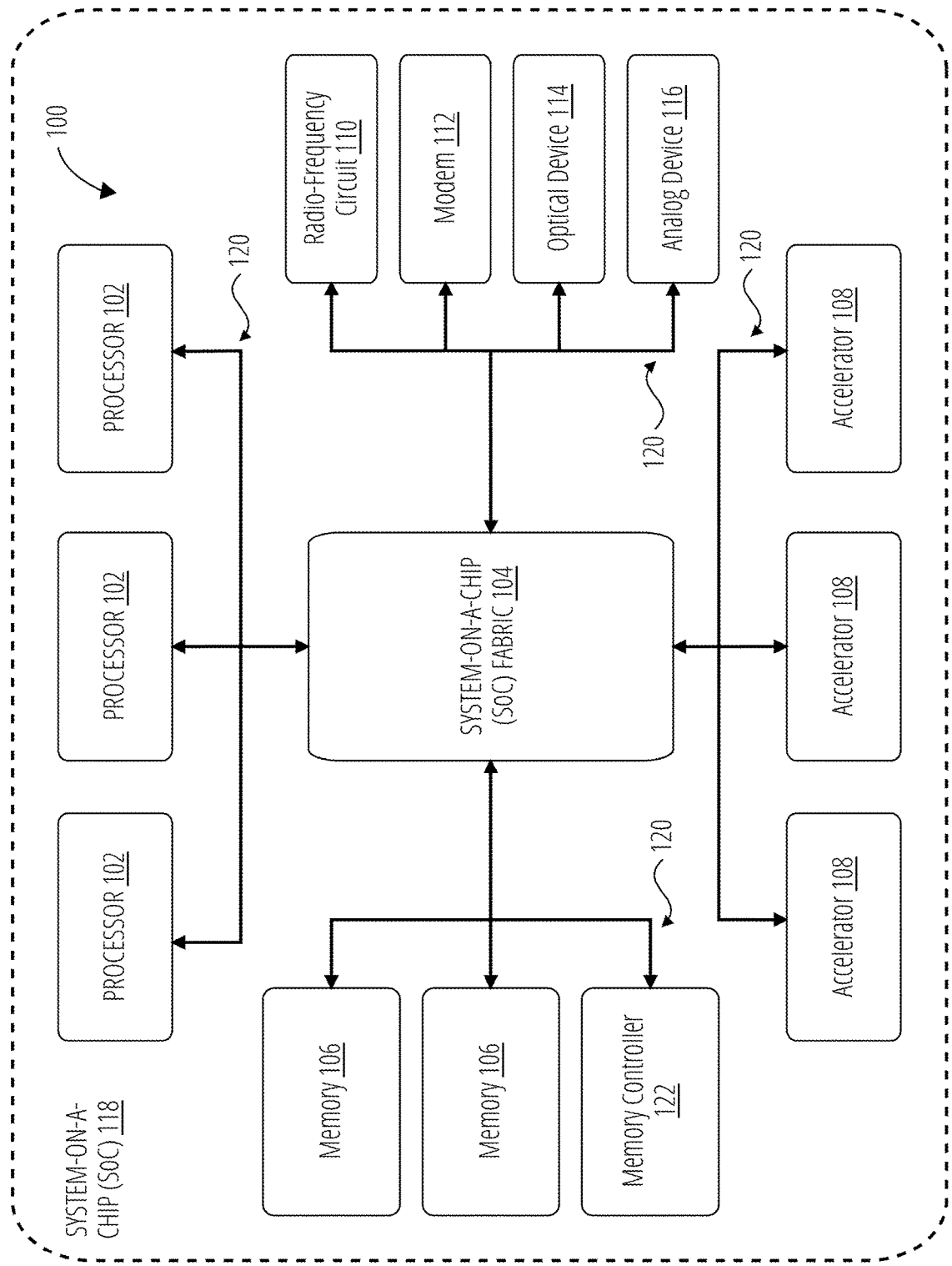
FIG. 1 illustrates a first system in accordance with one embodiment.

Embodiments described herein may include apparatus, systems, techniques, or processes that are directed to on-package die-to-die (D2D) interconnects. Specifically, embodiments herein may relate to on-package D2D interconnects for memory that use or relate to the Universal Chiplet Interconnect Express (UCIe) adapter or physical layer (PHY).

Embodiments are generally directed to improvements for interconnects suitable to communicate information between semiconductor dies arranged in on-package memory architectures. Some embodiments are particularly directed to implementing an interconnect such as a Universal Chiplet Interconnect Express (UCIe™) interconnect as defined by a Universal Chiplet Interconnect Express (UCIe™) specification promulgated by the UCIe Consortium, such as the UCIe specification, version 1.0, Feb. 17, 2022, along with any progeny, revisions and variants (collectively referred to as the "UCIe Specification"). Although some embodiments implement a UCIe interconnect, it may be appreciated that other semiconductor interconnects defined by other semiconductor specifications may be used as well. Embodiments are not limited in this context.

In general, UCIe is an open industry standard interconnect offering high-bandwidth, low-latency, power-efficient, and cost-effective on-package connectivity between chiplets, which are specialized integrated circuits (ICs). Although the UCIe interconnect is primarily designed to handle communications between chiplets, embodiments implement techniques to extend the UCI interconnect to manage communications between any types of semiconductor dies, such a system-on-a-chip (SoC) and one or more memory ICs, referred to as memory chips. The SoC and the memory chips are implemented as separate semiconductor dies on a same semiconductor package in various architectures. The SoC and the memory chips each instantiate UCIe interfaces and associated interface logic to allow the SoC and the memory chips to communicate standard memory signals as UCIe signals transported over the UCIe interconnect. This allows a unified solution to scale on-package memory to support various applications ranging from applications suitable for hand-held computers to high-performance computing (HPC) applications.

In one embodiment, for example, assume a SoC implements application logic and a memory controller to control memory operations on behalf of the application logic. Further assume an on-package memory chip implements one or more memory units. The memory controller may send read or write commands and associated data to the on-package memory chip using a standard memory interface and associated memory signals. Similarly, the memory unit of the on-package memory chip may receive the memory signals, and send responses to the memory controller using a standard memory interface and associated memory signals. In-between, the UCIe interfaces and associated interface logic implements a mapping between the UCIe interfaces and the memory interfaces. The UCIe interfaces use the mapping to map the memory signals to UCIe signals for transport over the UCIe interconnect, and the UCIe signals back to memory signals for communication to the memory controller or the memory units.

In one embodiment, for example, assume a SoC implements application logic and a SoC fabric. Further assume an on-package memory chip implements a memory controller and one or more memory units. The SoC fabric may send read or write commands and associated data on behalf of the application logic to the on-package memory chip using a standard memory interface and associated memory signals. Similarly, the memory controller of the memory unit of the on-package memory chip may receive the memory signals, and send a response to the SoC fabric using a standard memory interface and associated memory signals. In-between, the UCIe interfaces and associated interface logic implements a mapping between the UCIe interfaces and the memory interfaces. The UCIe interfaces use the mapping to map the memory signals to UCIe signals for transport over the UCIe interconnect, and the UCIe signals back to memory signals for communication to the memory controller or the memory units.

Legacy solutions for on-package memory may be considered to fall into two broad categories. The first category includes direct double data rate (DDR) (e.g., low-power DDR (LPDDR) memory) package-on-package memory that may be used in client applications that are constrained by the area (e.g., hand-held, laptop etc.). The second category includes high bandwidth memory (HBM) running at very wide links at low speeds and supporting multiple independent channels (e.g., 16 channels at 64 bits each at 6.4 gigatransfers per second (GT/s) in HBM3) on an advanced package for High Performance Compute (HPC) type applications at significantly higher cost.

Embodiments are generally directed to a unified solution that scales across hand-held or client segments and applications through server and HPC segments. In some embodiments, the unified solution uses a same LPDDR memory on-package with another semiconductor device. In one embodiment, for example, the semiconductor device may be implemented with features and specifications as defined by a Universal Chiplet Interconnect Express (UCIe™) specification promulgated by the UCIe Consortium, such as the UCIe specification, version 1.0, Feb. 17, 2022, along with any progeny, revisions and variants (collectively referred to as the "UCIe Specification"), among other semiconductor specifications. As a result, such packages may achieve cost, power and latency benefits with almost identical bandwidth density even with standard packaging. For example, DDR pins may be approximately 5-10 pJ/b, as opposed to approximately 0.5 pJ/b for UCIe in a standard package. In another example, an estimated ~10 nanosecond (ns) round-trip latency savings may be achieved based on a latency delta between a UCIe physical layer (PHY) versus a DDR PHY. For higher memory bandwidth applications, embodiments offer multiple channels using a similar approach as for clients, while capable of connecting to multiple dies through a logic-die fan-out (if needed). Embodiments offer significantly higher bandwidth density than UCIe as compared to HBM, and provides the ability to offer lower cost solutions when a standard package is used with a similar latency and power efficiency profile.

Embodiments may include one or more of the following independent applications to service the needs of different market segments. Some examples of independent applications are described below. Embodiments are not limited to these examples.

In some embodiments, such as for mobile or client usage, mapping LPDDR timings on the UCIe PHY for in-package memory gives latency, power and bandwidth density advantages relative to off-package dynamic random access memory (DRAM). The mapping can be done by porting a subset of DDR PHY Interface (DFI) signals over UCIe to minimize changes to existing memory controller designs, while retaining all the benefits of UCIe. In some examples, the DFI signals may refer to signals processed by the DFI. The DFI is used in several consumer electronics devices including smart phones. DFI is an interface protocol that defines signals, timing, and programmable parameters required to transfer control information and data to and from the DRAM devices, and between a microcontroller and PHY. DFI is applicable to all DRAM protocols including DDR4, DDR3, DDR2, DDR, LPDDR4, LPDDR3, LPDDR2 and LPDDR.

In some embodiments, such as for scaling to HBM-like density or usages, both for standard and advanced package applications of UCIe, scaling speeds to 32 GT/s provide an appropriate scale up for these applications. A UCIe three-dimension (3D) may unlock a further exponential scaling of bandwidth density for these applications.

In some embodiments, such as for decoupling memory subsystem from system-on-a-chip (SoC) fabric altogether at a higher level of abstraction, while keeping advantages of in-package disaggregation, embodiments provide example mappings of compute express link (CXL) memory protocol (CXL.mem) signals that may lower the area and power overheads relative to traditional CXL stack construction.

In some embodiments, optimization techniques are also applied for traditional serializer/deserializer (SERDES) applications as well, some of which may be added to the CXL specification as an option.

In some embodiments, techniques are used to extend UCIe PHY with asymmetry to enable a memory controller to share a same PHY with the peripheral component interconnect express (PCIe) or CXL usages and leveraging the rest of the UCIe infrastructure In some embodiments, the UCIe PHY and die-to-die (D2D) adapter may be used "as-is" with extensions to include extra lanes as needed for each of the solutions described below. This may include adding extra widths natively in an asymmetric manner as well as using multiple UCIe clusters where some lanes may be "Reserved" and turned off to save power while taking advantage of existing bump-outs.

FIG. 1 illustrates an example of a system 100. System 100 may be an electronic system, such as a computing system, that implements one or more semiconductor devices on a semiconductor die in a system-on-a-chip (SoC) implementation. The semiconductor die may implement one or more interconnects and associated link protocols defined by a semiconductor specification, such as the UCIe Specification, for example. UCIe is an open industry standard interconnect offering high-bandwidth, low-latency, power-efficient, and cost-effective on-package connectivity between chiplets.

System 100 illustrates an example of multiple semiconductor devices in a SoC 118. System 100 illustrates a die level integration to deliver power-efficient and cost-effective performance. The SoC 118 can be integrated with other semiconductor dies at the package level with applicability from hand-held to high-end servers with dies from multiple sources connected through different packaging options even on the same package.

As depicted in FIG. 1, the SoC 118 includes one or more processors 102 and one or more memory 106 coupled to a SoC fabric 104. A processor 102 may include any processing element, such as a microprocessor, a host processor, an embedded processor, a co-processor, or other processor. Each processor 102 is coupled to SoC fabric 104 through a link 120, such as a front-side bus (FSB), for example. In one embodiment, the link 120 is a serial point-to-point interconnect as described below. In another embodiment, link 120 includes a serial, differential interconnect architecture that is compliant with different interconnect standards. Interconnect protocols and features discussed below may be utilized to implement the links 120 coupling the set of components introduced here in FIG. 1.

Memory 106 includes any memory device, such as random access memory (RAM), non-volatile (NV) memory, or other memory accessible by devices in system 100. Memory 106 is coupled to SoC fabric 104 through a link 120, such as a memory interface, for example. Examples of a memory interface include a double-data rate (DDR) memory interface, a dual-channel DDR memory interface, a low power DDR (LPDDR), a dynamic RAM (DRAM) memory interface, or other types of memory interfaces.

The SoC fabric 104 is an interconnect infrastructure within a SoC design. It encompasses a network of wires, buses, and interconnects that facilitate communication and data transfer between various components and subsystems integrated on a single chip. The SoC fabric 104 serves as the backbone for connecting different functional blocks, such as the central processing unit (CPU) cores, memory controllers, input/output interfaces, graphics processors, accelerators, and other Intellectual Property (IP) blocks. It enables these components to communicate, share data, and work together to perform the desired tasks efficiently. The SoC fabric 104 is responsible for managing data flow, routing signals, and maintaining the necessary data paths between different components. It ensures that data is transmitted accurately and with low latency, while also optimizing power consumption and overall performance.

Although not shown, the SoC fabric 104 may be coupled to off-die devices. Input/Output (I/O) modules, also referred to as interfaces or ports, may implement a layered protocol stack to provide communication between SoC fabric 104 and one or more semiconductor devices implemented on other semiconductor dies in a semiconductor package.

The SoC 118 may further include one or more accelerators 108. An accelerator is a separate architectural substructure that is architected using a different set of objectives than the base processor, where these objectives are derived from the needs of a special class of applications. Examples of accelerators include a graphics accelerator to enhance graphics rendering capability, a cryptographic accelerator to help with encryption or decryption, a web accelerator to improve web applications, a hypertext preprocessor (PHP) accelerator to assist in web development, and so forth.

The SoC 118 may include other semiconductor devices or components to implement various compute or communications functions, such as a radio-frequency circuit 110, a modem 112, an optical device 114, an analog device 116, and so forth. Embodiments are not limited in the type or number of semiconductor devices implemented for the SoC 118.

Figure 2:
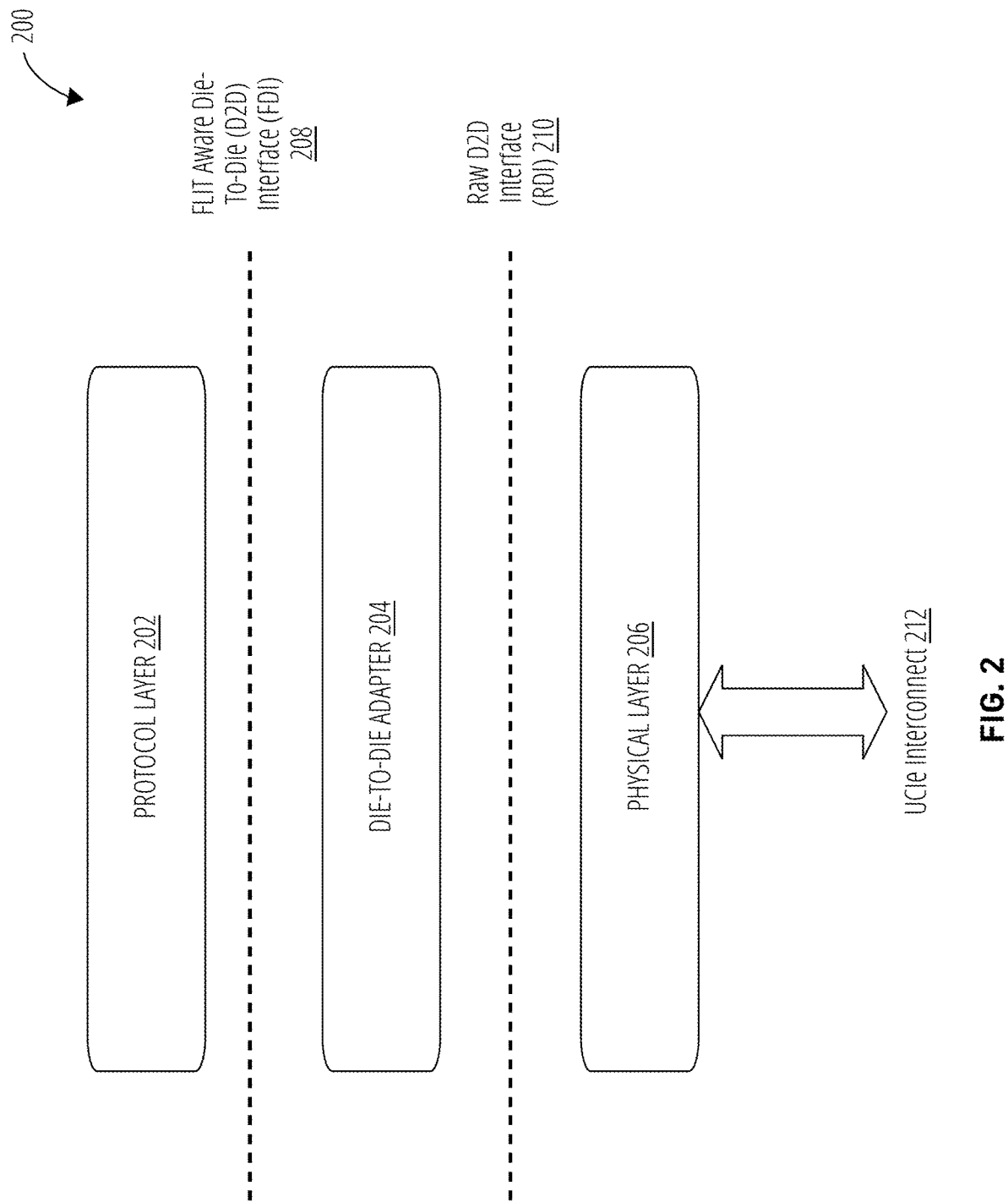
FIG. 2 illustrates an interconnect stack in accordance with one embodiment.

FIG. 2 illustrates a UCIe interconnect stack 200. In various embodiments, the SoC 118 may implement a UCIe interconnect 212, as defined by the UCIe Specification. The SoC 118 may use the UCIe interconnect 212 to communicate with other semiconductor dies within a same semiconductor package, as described with reference to FIG. 3.

In general, UCIe is an open industry standard interconnect offering high-bandwidth, low-latency, power-efficient, and cost-effective on-package connectivity between chiplets. The UCIe Specification defines a ubiquitous interconnect at the package level and covers the die-to-die (D2D) input/output (I/O) physical layer, D2D protocols, and software stack which leverage the well-established Peripheral Component Interconnect Express (PCI Express® or PCIe®) and Compute Express Link™ (CXL™) industry standards.

The UCIe Specification details the complete standardized D2D interconnect with physical layer, protocol stack, software model, and compliance testing that will enable end users to easily mix and match chiplet components from a multi-vendor ecosystem for System-on-Chip (SoC) construction, including customized SoC. The physical layer supports up to 32 GT/s with 16 to 64 lanes and uses a 256 byte Flow Control Unit (FCU) for data, similar to PCIe 6.0. The protocol layer is based on Compute Express Link with CXL.io (PCIe), CXL.mem and CXL.cache protocols. Various on-die interconnect technologies are defined, like organic substrate for a "standard" 2D package, or embedded silicon bridge (EMIB), silicon interposer, and fanout embedded bridge for "advanced" 2.5D/3D packages. In some embodiments, physical specifications are based on the Advanced Interface Bus (AIB) as defined by Intel Corporation, headquartered in Santa Clara, California. However, other embodiments may implement physical specification based on other bus specifications. Embodiments are not limited in this context.

UCIe supports different data rates, widths, bump-pitches, and channel reach to ensure the widest interoperability feasible. It defines a sideband interface for ease of design and validation. The unit of construction of the interconnect is a cluster which comprises of N single-ended, unidirectional, full-duplex data lanes (where N=16 for standard package and 64 for advanced package), one single-ended lane for valid, one lane for tracking, a differential forwarded clock per direction, and 2 lanes per direction for sideband (e.g., single-ended, one 1200 MHz clock and one data). The advanced package supports spare lanes to handle faulty lanes (e.g., including clock, valid, sideband, etc.) whereas the standard package supports width degradation to handle failures. Multiple clusters can be aggregated to deliver more performance per link.

UCIe is a layered protocol as represented by a UCIe interconnect stack 200. The UCIe interconnect stack 200 may comprise a protocol layer 202, a die-to-die adapter 204, and a physical layer 206.

The physical layer 206 may be coupled to a UCIe interconnect 212, such as the UCIe interconnect 304 described with reference to FIG. 3. The physical layer 206 is responsible for the electrical signaling, clocking, link training, sideband, and other physical layer operations. Information may be passed between the physical layer 206 and the die-to-die adapter 204 over a raw D2D interface (RDI) 210.

The die-to-die adapter 204 provides link state management and parameter negotiation for chiplets and semiconductor dies, such as the SoC 118, for example. It optionally guarantees reliable delivery of data through its cyclic redundancy check (CRC) and link level retry mechanism. When multiple protocols are supported, it defines the underlying arbitration mechanism. A 256-byte flow control unit (FCU) level interface transfer (FLIT) defines the underlying transfer mechanism when the adapter is responsible for reliable transfer. Information may be passed between the die-to-die adapter 204 and the protocol layer 202 over a FLIT aware D2D interface (FDI) 208.

UCIe maps PCIe and CXL protocols natively as those are widely deployed at the board level across all segments of compute. This is done to ensure seamless interoperability by leveraging the existing ecosystem. With PCIe and CXL, SoC construction, link management, and security solutions that are already deployed can be leveraged to UCIe. The usage models addressed are also comprehensive: data transfer using direct memory access, software discovery, error handling, etc., are addressed with PCIe/CXL.io; the memory use cases are handled through CXL.mem; and caching requirements for applications such as accelerators are addressed with CXL.cache. UCIe also defines a "streaming protocol" which can be used to map any other protocol. Further, the UCIe consortium can innovate on protocols in the future optimized for chiplets and semiconductor dies as usage models evolve in the future.

Although the UCIe interconnect 212 is designed to handle communications between chiplets, which are specialized integrated circuits (ICs), it can be extended to manage communications between any semiconductor dies, such as the SoC 118 and one or more memory ICs, referred to as memory chips. The SoC 118 and the memory chips are implemented as separate semiconductor dies on a same semiconductor package. The SoC 118 and the memory chips each instantiate UCIe interfaces and associated interface logic to allow the SoC 118 and the memory chips to communicate standard memory signals as UCIe signals transported over the UCIe interconnect 212. For example, the memory controller 122 of the SoC 118 may send read or write commands and data for an on-package memory unit using a standard memory interface and associated memory signals. Similarly, the on-package memory unit may receive the memory signals, and send a response to the memory controller 122 using a standard memory interface and associated memory signals. In-between, the UCIe interfaces and associated interface logic maps the memory signals to UCIe signals for transport over the UCIe interconnect 212, and the UCIe signals back to memory signals for communication to the memory controller 122 or the memory units. This allows a unified solution to scale on-package memory to support various applications ranging from applications suitable for hand-held computers to HPC type applications.

Figure 3:
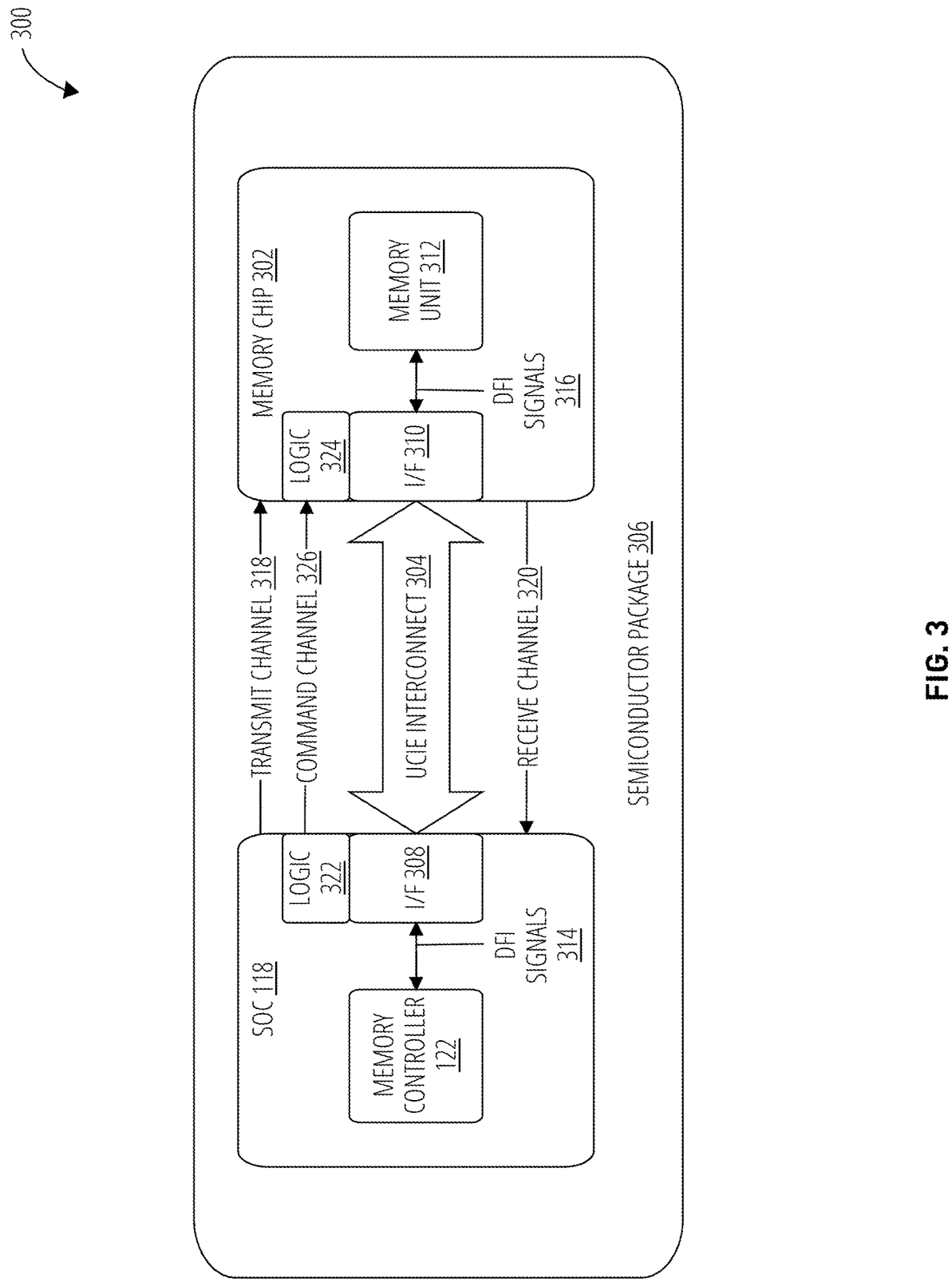
FIG. 3 illustrates a second system in accordance with one embodiment.

FIG. 3 illustrates a system 300. System 300 isolates a pair of semiconductor dies that may be implemented by the system 100. System 300 may comprise a SoC 118 and a memory chip 302 integrated on a single semiconductor package 306. The SoC 118 may exchange signals with the memory chip 302 over a UCIe interconnect 304. The SoC 118 and the memory chip 302 may implement UCIe interface 308 and UCIe interface 310, respectively. The SoC 118 and memory chip 302 may also implement interface logic 322 and interface logic 324, respectively. In one embodiment, the UCIe interface 308, the UCIe interface 310, the interface logic 322, the interface logic 324, and the UCIe interconnect 304 may be compliant with the UCIe Specification.

In various embodiments, operations for the UCIe interface 308 and the interface logic 322 mirror operations for the UCIe interface 310 and the interface logic 324, and vice-versa. Consequently, operations discussed with respect to the UCIe interface 308 and the interface logic 322 of the SoC 118 are the same or similar as those for the UCIe interface 310 and the interface logic 324 of the memory chip 302, and vice-versa.

In various embodiments, the memory controller 122 of the SoC 118 may communicate with a memory unit 312 of the memory chip 302 via the UCIe interconnect 304. In one embodiment, for example, the UCIe interface 308 and the UCIe interface 310 may each implement interface logic 322 and interface logic 324, respectively, to manage communications over the UCIe interconnect 304. Each of the interface logic 322 and the interface logic 324 manages transport of data over the UCIe interconnect 304 in a transmit mode and a receive mode.

From the perspective of the SoC 118, in the transmit mode, the UCIe interface 308 receives memory signals from the memory controller 122. The memory signals may comprise, for example, write or read commands represented as DFI signals 314. The interface logic 322 decodes the DFI signals 314, and maps the memory signals to corresponding UCIe signals. The interface logic 322 encodes the UCIe signals for transmission over a transmit channel 318 of the UCIe interconnect 304.

From the perspective of the memory chip 302, in the receive mode, the UCIe interface 310 receives the UCIe signals from the transmit channel 318. The interface logic 324 decodes the UCIe signals, and maps the UCIe signals to corresponding memory signals, such as the DFI signals 316. The UCIe interface 310 sends the DFI signals 316 to the memory unit 312. The memory unit 312 receives the DFI signals 316, and generates a response. For example, if the DFI signals 316 represent a read request, the memory unit 312 retrieves the requested data, and sends the data as DFI signals 316 back to the UCIe interface 310. In the transmit mode, the interface logic 324 decodes the DFI signals 316, and maps the memory signals to corresponding UCIe signals. The UCIe interface 310 sends the UCIe signals over the receive channel 320 of the UCIe interconnect 304 to the SoC 118.

Returning to the perspective of the SoC 118, in the receive mode, the UCIe interface 308 receives the UCIe signals from the receive channel 320 of the UCIe interconnect 304. The interface logic 322 decodes the UCIe signals, and maps the UCIe signals to memory signals, and encodes the memory signals as DFI signals 314 for transmission to the memory controller 122.

In various embodiments, the memory signals are double data rate (DDR) memory signals or high bandwidth memory (HBM) memory signals. For example, the memory signals may comprise signals associate with a DDR memory interface, a dual-channel DDR memory interface, a LPDDR memory interface, a dynamic RAM (DRAM) memory interface, or other types of memory interfaces.

In one embodiment, the memory signals comprise double data rate (DDR) physical layer (PHY) interface (DFI) signals. In the transmit mode, the interface logic 322 maps DFI signals 314, such as DFI command and data timing signals, for a DDR PHY interface to UCIe command and data timing signals for a UCIe PHY interface. In the receive mode, the interface logic 322 maps UCIe command and data timing signals for the UCIe PHY interface to the DFI signals 314, such as the DFI command and data timing signals for the DDR PHY interface.

In one embodiment, the interface logic 322 encodes the UCIe signals for transmission over the transmit channel 318 of the UCIe interconnect 304 to the memory chip 302 in a same semiconductor package 306 as the SoC 118. Similarly, the interface logic 322 decodes the UCIe signals from the receive channel 320 of the UCIe interconnect 304 from the memory chip 302 in the same semiconductor package 306 as the SoC 118.

In one embodiment, the interface logic 322 encodes cyclic redundancy check (CRC) or error checking and correcting (ECC) signals for the UCIe signals for transmission over a command channel 326 of the UCIe interconnect 304. The interface logic 322 decodes the CRC signals or ECC signals for the UCIe signals from the command channel 326 of the UCIe interconnect 304.

By way of example and not limitation, assume the memory unit 312 is a LPDDR5 (x8) memory unit with a burst length of 8 to illustrate the benefits of moving memory devices within the semiconductor package 306. It is important to note that, given how signal mapping and timings are enforced, there may be no need of buffering or logic overhead on the memory chip 302. Except for deserialization of command signals, the rest of the timings may match native LPDDR5 timings enforced by the memory controller 122. In some embodiments, the UCIe timings may be the same or similar as the timings the memory chip 302 needs to take identical steps when sending packets over DFI for an LPDDR connection. An example mapping is shown in TABLE 1.

TABLE 1

|  | LPDDR5x-BG Mode | UCIe Mapping | Unit |
|---|---|---|---|
| Data rate | 8000 | 8000 | Mbps |
| LP WCK:CK | 4 | NA |  |
| WCK/UCIe CLK | 0.25 | 0.25 | ns |
| LP CK (CMD) | 1 | NA | ns |
| UCIe Valid Frame | NA | 1 | ns |

TABLE 1 is an example of a low-power DDR5 (LP5x) to UCIe frequency mapping with an 8 gigabits per second (Gbps) data rate. As depicted in TABLE 1, the LP5x write clock (WCK) may be considered to be the same frequency as the UCIe clock. Generally, the command interface is simplified in UCIe by mapping it to the same clock as data. Each valid frame in UCIe is 1 nanoseconds (ns) at this data rate, which is the same as the clock cycle time (tCK) in LP5. This may allow all the command and data timings from DFI to be a passed through without additional design burden.

TABLE 2 shows an example signal mapping between one LP5x (x8) channel to UCIe signals.

TABLE 2

|  | LPDDR5x-x8 [x16] | | UCIe Mapping for x8 [x16] | |
|---|---|---|---|---|
|  | Direction | Number of Pins | Direction | Number of Pins |
| Command strobe | Soc -> Mem | 2 (differential) | N/A (reuse data clock) | N/A |
| Write data strobe | Soc -> Mem | 2 (differential) | Soc -> Mem | 2 |
| Read data strobe | Mem -> Soc | 2 (differential) [4] 1 of these pins per 8 lanes is bidirectional and carries ECC for writes | Mem -> SoC | 2 |
| CMD | SoC -> Mem | 7 | SoC -> Mem | 2 (32b sent over @ 8GT/s) |
| CS | SoC -> Mem | 1 | SoC -> Mem |  |
| Data (DQ) | SoC <-> Mem (bidirectional) | 8 (bi-directional) [16] | SoC -> Mem + Mem -> Soc (unidirectional) | 8 (per direction) [16] |
| CRC (optional) | NA | NA | SoC -> Mem + Mem -> Soc (unidirectional) | 1 (for CMD + Data) |
| DMI for Wr, Ecc for reads | SoC <-> Mem | 1 [2] | SoC -> Mem + Mem -> Soc (unidirectional) | 1 (per direction) [2] |
| ECC for writes | SoC <-> Mem | 0 (sent over one of the pins of read clock) | SoC -> Mem (unidirectional) | 1 [2] |
| Total |  | 23 [34] |  | 27 [46] |

TABLE 2 illustrates an example of a LP5x to UCIe signal mapping. LPDDR5(x) has seven CMD pins (CA[6:0]) and one chip select (CS). In this example, the command (CMD)

and CS bus is mapped to the same clock as data on UCIe. For example, CA[3:0] are mapped to a lower command lane and CA[7:4] and CS are mapped to an upper command lane on UCIe. The eight (bi-directional) date/read/write data (DQ) lanes on LPDDR5(x) are assigned to 8 lanes in each direction on UCIe for a ×8 mapping, shown in TABLE 2, and a ×16 mapping may have 16 data lanes per direction. The direct media interface (DMI) signal which performs multiple functions-data masking for writes (1 bit per byte) and carrying ECC for reads on LPDDR is mapped to one lane in each direction on UCIe for a ×8, and two lanes in each direction for a ×16. To support ECC for writes, an extra lane for ×8 (2 extra lanes for ×16) is allocated in UCIe. LPDDR may repurpose the read data strobe (RDQS) for this purpose, and it may carry 6 bits ECC for DMI, 9 bits of ECC for Data for 128bits; these are mapped to bits [15:1] of the bytes sent on the ECC lane on UCIe. WCK and RDQS are mapped to clocks on UCIe transmit (Tx) and receive (Rx) modules respectively.

The total Lane count for UCIe may be shown in one or both of TABLE 2 as discussed above or TABLE 3 as discussed further below. For a ×8 mapping, one module of a standard package may have redundant lanes for any additional features. For a ×16 mapping, 1.5 UCIe standard package modules may be sufficient.

With respect to error handling, for UCIe link speeds where the bit error rate (BER) is 1e-27 or better (e.g., the standard package example above running at 8GT/s), there may be no need for additional cyclic redundancy check (CRC) or error checking and correcting (ECC) protection. This is because it may give better BER than conventional double data rate I/O (DDRIO) package traces. When scaling to higher speeds where the UCIe BER is 1e-15, additional ECC or CRC protection can be added on the command wires as a separate UCIe lane, along with an error signal coming back from the memory chip 302 to the SoC 118. In some cases, there may be an upper bound on how long it takes to signal an error. Any error indication pulsed may require the memory controller to take appropriate actions, such as the memory controller 122 replaying the commands from a previous time.

Figure 4:
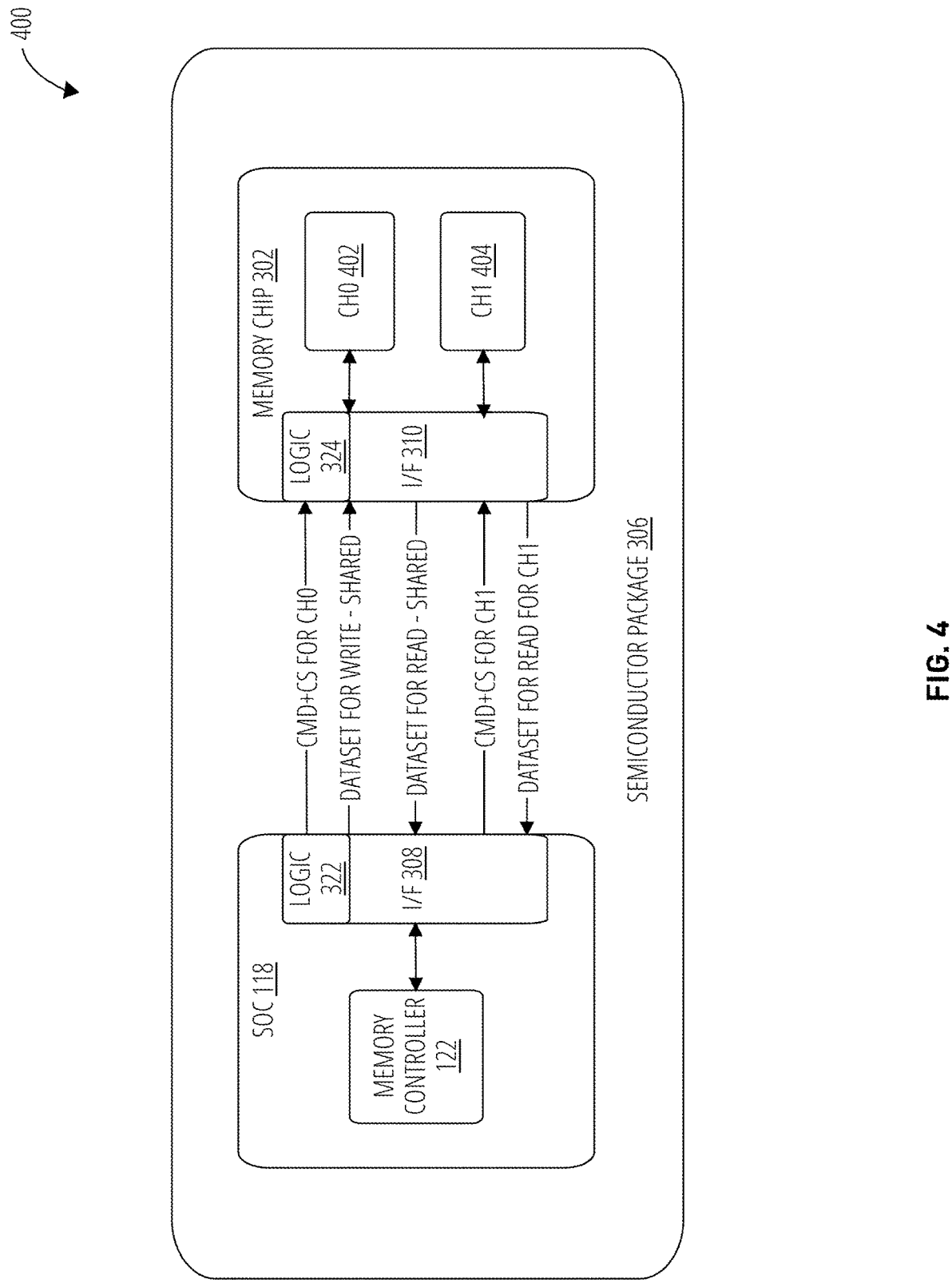
FIG. 4 illustrates a third system in accordance with one embodiment.

FIG. 4 illustrates a system 400. The system 400 is similar to the system 300. However, the system 400 is an example of a first option to extend the UCIe interconnect 212 to include multiple channels. The system 400 illustrates an example of scaling to 2 channels of memory devices on the same memory chip 302.

The DFI mapping over UCIe is extended to support multiple channels on the memory chip 302 for cases where higher density or bandwidth is needed. Embodiments may implement three example options related to such extension, with a first option depicted in FIG. 4, a second option depicted in FIG. 5, and a third option depicted in FIG. 6. It may be appreciated that other embodiments may include more/fewer/different options than depicted in the examples shown in FIG. 4, FIG. 5, or FIG. 6.

System 400 depicts a first option to support multiple channels. In various embodiments, interface logic 322 of the SoC 118 encodes UCIe signals for transmission over multiple transmit channels of the UCIe interconnect 304. The interface logic 322 decodes the UCIe signals from multiple receive channels of the UCIe interconnect 304.

By way of example and not limitation, command signals are scaled and an extra set of data returns are added to support 2 read 1 write (2r1w) optimized scaling. A first command channel transmits CMD and CS signals for CH0 402. A second command channel transmits CMD and CS signals for CH1 404. A transmit channel transmits a dataset for writes, which is shared between CH0 402 and ch1 404. Two receive channels are used for datasets for reads for CH0 402 and dataset for reads for CH1 404, respectively. In some embodiments, it may be desirable to ensure that the memory chip 302 routes the shared write data bus to both CH0 402 and CH1 404. Additionally, it may be the responsibility of the memory controller 122 on the SOC 118 to ensure that there is no collision of data on the shared data bus.

Figure 5:
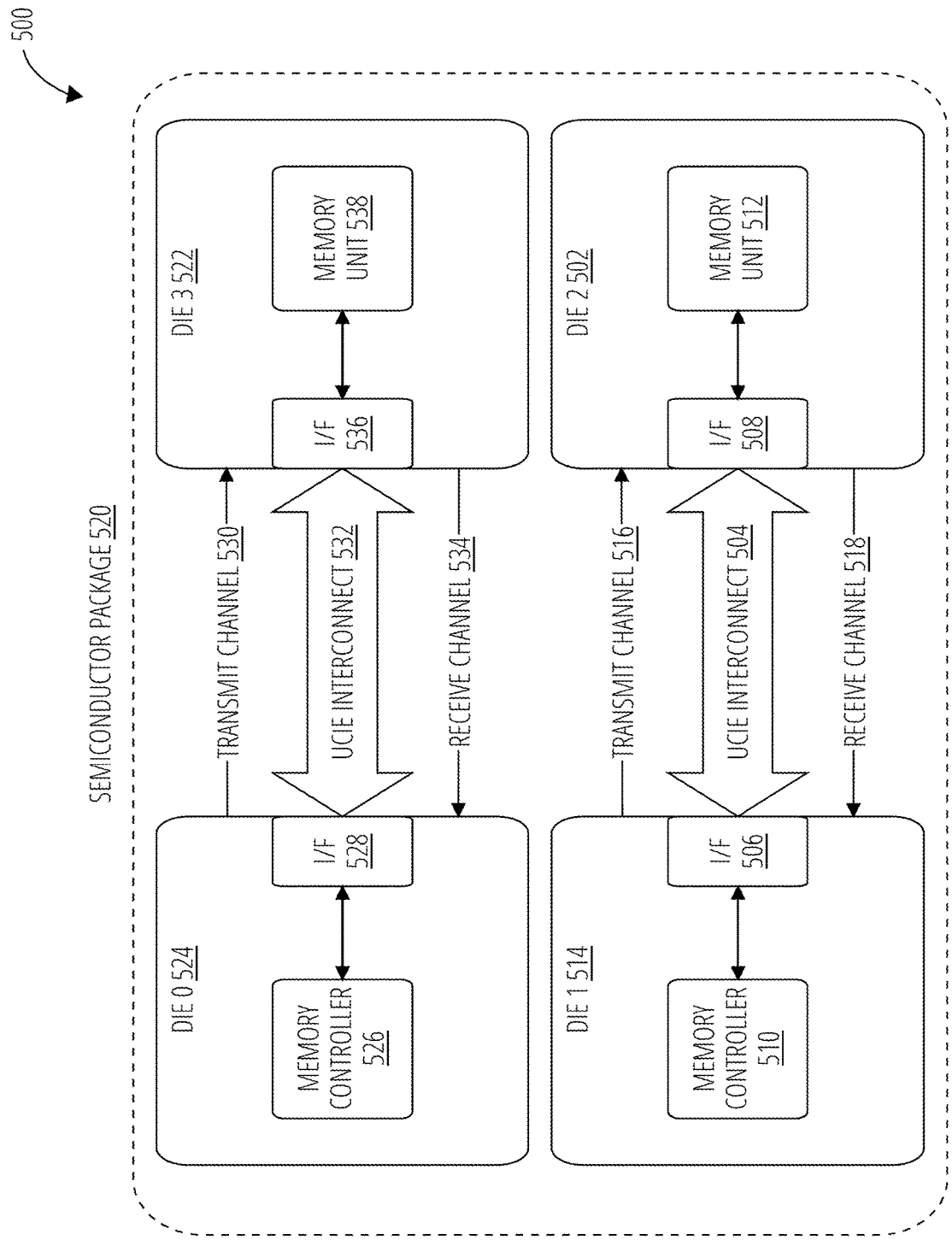
FIG. 5 illustrates a fourth system in accordance with one embodiment.

FIG. 5 illustrates a system 500. System 500 is an example of second option to extend DFI mapping over UCIe to support multiple channels in a semiconductor package. In the second option, the single channel assignment of system 300 is considered a unit module. The second option instantiates the unit module of system 300 multiple times to scale to multiple channels. System 500 is an example of scaling to channels of memory devices, with 4 semiconductor dies comprising 2 SoC and 2 memory chips on a single semiconductor package 520.

As depicted in FIG. 5, the system 500 comprises 4 dies including die 0 524, die 1 514, die 2 502 and die 3 522. The die 0 524 and the die 1 514 each represent a SoC, such as SoC 118. The die 2 502 and die 3 522 each represent a memory unit, such as memory unit 312. The die 0 524 and the die 3 522 operate in a manner similar to system 300 to transport memory signals mapped to UCIe signals over the UCIe interconnect 532. The transport occurs in both directions, as previously described with reference to system 300 and system 400.

Similar to system 300 and system 400, the system 500 includes a SoC die 0 524 that further includes a memory controller 526 and a UCIe interconnect 532 coupled to interface 528 and interface 536. The UCIe interconnect 532 includes interface logic (e.g., interface logic 322) to manage transport of data over the UCIe interconnect 532 in a transmit mode and a receive mode. The interface logic encodes UCIe signals for transmission over a transmit channel 530 of the UCIe interconnect 532 to a memory chip die 3 522 comprising a memory unit 538 in a same package as the SoC die 0 524. The interface logic decodes the UCIe signals from a receive channel 534 of the UCIe interconnect 532 from the memory chip die 3 522 in the same package as the SoC die 0 524.

The system 500 also includes a second SoC die 1 514 that further includes a second memory controller 510 and a second UCIe interconnect 504 coupled to interface 506 and interface 508. The second UCIe interconnect 504 includes second interface logic (e.g., interface logic 322) to manage transport of data over the second UCIe interconnect 504 in a transmit mode and a receive mode. The second interface logic encodes UCIe signals for transmission over a transmit channel 516 of the second UCIe interconnect 504 to a second memory chip die 2 502 in a same package as the second SoC die 0 524. The second interface logic decodes the UCIe signals from a receive channel 518 of the second UCIe interconnect 504 from the second memory chip die 2 502 in the same package as the SoC die 0 524.

Figure 6:
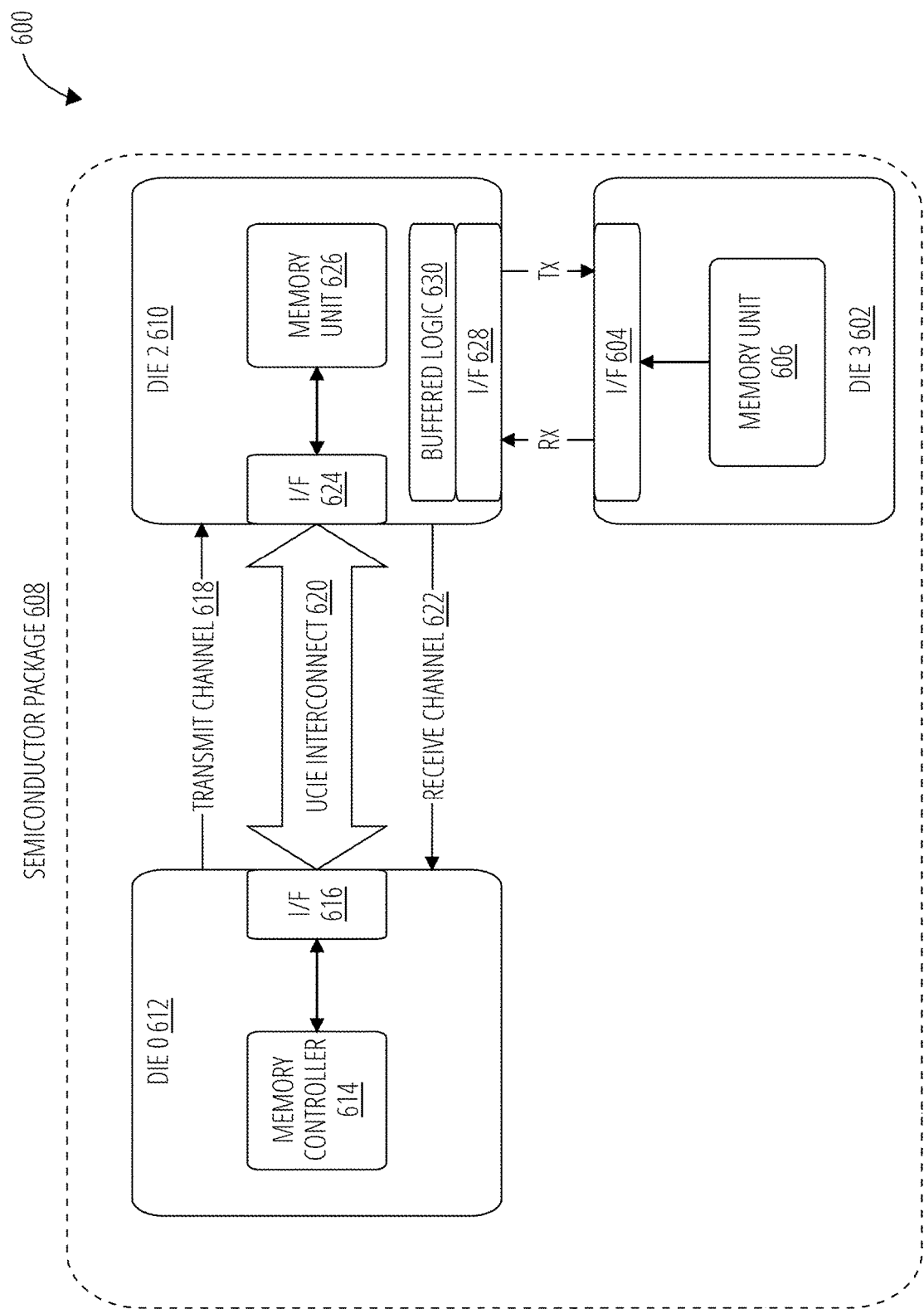
FIG. 6 illustrates a fifth system in accordance with one embodiment.

FIG. 6 illustrates a system 600. System 600 is an example of third option to extend DFI mapping over UCIe to support multiple channels in a semiconductor package. System 600 illustrates a case of daisy chaining UCIe links between memory dies.

System 600 assumes that the UCIe link to a memory controller is provisioned to support an aggregate bandwidth of 2 channels. However, in some embodiments, the UCIe link to memory controller is provisioned to be asymmetric for two read 1 write (2r1w) flows. This option provides cost advantages relative to the second option shown in the system 500 at the expense of memory latency. The UCIe to UCIe conversion for memory channel CH1 device traffic may be done through "buffered" logic on the die that carries the memory channel CH0 device.

The system 600 illustrates a memory architecture comprising a daisy chain of a UCIe interconnect 620 between a SoC die 0 612, a first memory chip die 2 610, and a second memory chip die 3 602. Similar to system 300 and system 400, the system 600 includes a SoC die 0 612 that further includes a memory controller 614 and a UCIe interconnect 620. The UCIe interconnect 620 is coupled to interface 616 and interface 624, and includes interface logic (e.g., interface logic 322) to manage transport of data over the UCIe interconnect 620 in a transmit mode and a receive mode. The interface logic encodes UCIe signals for transmission over a transmit channel 618 of the UCIe interconnect 620 to a memory chip die 2 610 comprising a memory unit 626 in a same package as the SoC die 0 612. The interface logic decodes the UCIe signals from a receive channel 622 of the UCIe interconnect 620 from the memory chip die 2 610 in the same package as the SoC die 0 612.

In addition, the interface logic encodes UCIe signals for transmission over the transmit channel 618 of the UCIe interconnect 620 through buffered logic 630 of the first memory chip die 2 610 in a same package as the SoC die 0 612 for a second memory chip die 3 602 via interface 604 and interface 628. The second memory chip die 3 602 comprises a memory unit 606 in the same package as the SoC die 0 612 and the first memory chip die 2 610. The interface logic decodes the UCIe signals from a receive channel 622 of the UCIe interconnect 620 from the second memory chip die 3 602 through the buffered logic 630 of the first memory chip die 2 610.

Some embodiments implement techniques to scale density or bandwidth for the system 300, system 400, system 500 or system 600. To scale up bandwidth density, an advanced package of UCIe may provide groupings of x64 lanes. When running at 32GT/s, 4 modules of such clusters can help achieve close to 1 TB/s using the same mapping as DFI provided above.

In some embodiments, UCIe may expand to three-dimensional (3-D) interconnects, and the same DFI mapping with much wider data bus may be used to scale the bandwidth density on the order of approximately 25x or more. This scaling may be achievable because, at a minimum, it may be targeting a 9 micrometer (um) bump pitch relative to 45 um bump pitch, which may result in a 25x improvement in density overall. TABLE 3 provides an example comparison of bandwidth densities for different cases.

TABLE 3

|  | Shore line (mm) | Depth (mm) | Area (mm^2) | per Lane (GT/s) | Lanes | BW per cluster * (GB/s) | BW shore line Density (GB/s/mm) | BW area density (GB/s/mm^2) |
|---|---|---|---|---|---|---|---|---|
| HBM3 | 7.725 | 2.665 | 20.587125 | 8 | 1024 | 1024 | 132.5566343 | 49.73982525 |
| UCIe - A (Tx or Rx only) | 0.3888 | 1.043 | 0.4055184 | 32 | 64 | 256 | 658.436214 | 631.2907133 |
| UCIe - A (Tx + Rx) | 0.3888 | 1.043 | 0.4055184 | 32 | 128 | 512 | 1316.872428 | 1262.581427 |
| UCIe-S (Tx or Rx Only) | 0.5715 | 1.32 | 0.75438 | 32 | 16 | 64 | 111.9860017 | 84.83788011 |
| UCIe-S (Tx + Rx) | 0.5715 | 1.32 | 0.75438 | 32 | 32 | 128 | 223.9720035 | 169.6757602 |
| LPDD R5x (Based on LP DRAM die) Off package 15 columns and 8 rows (0.8 mm x 0.7 mm) | 12 | 5.6 | 67.2 | 8.533 | 16 | 17.066 | 1.422166667 | 0.253958333 |

TABLE 3 illustrates bandwidth density comparisons. UCIe-A may refer to the Advanced Package of UCIe. UCIe-S may refer to the Standard Package of UCIe. The rows corresponding to transmit (Tx) only or receive (Rx) only may refer to unidirectional bandwidth, and the rows corresponding to (Tx+Rx) may refer to bidirectional bandwidth. When aggregating multiple devices behind a given set of UCIe links, additional "buffered memory" logic may be required to split the command and data streams between different devices or memory channels. Note the cluster size may be different for different technologies, and one metric that may be considered useful is BW Density.

Figure 7:
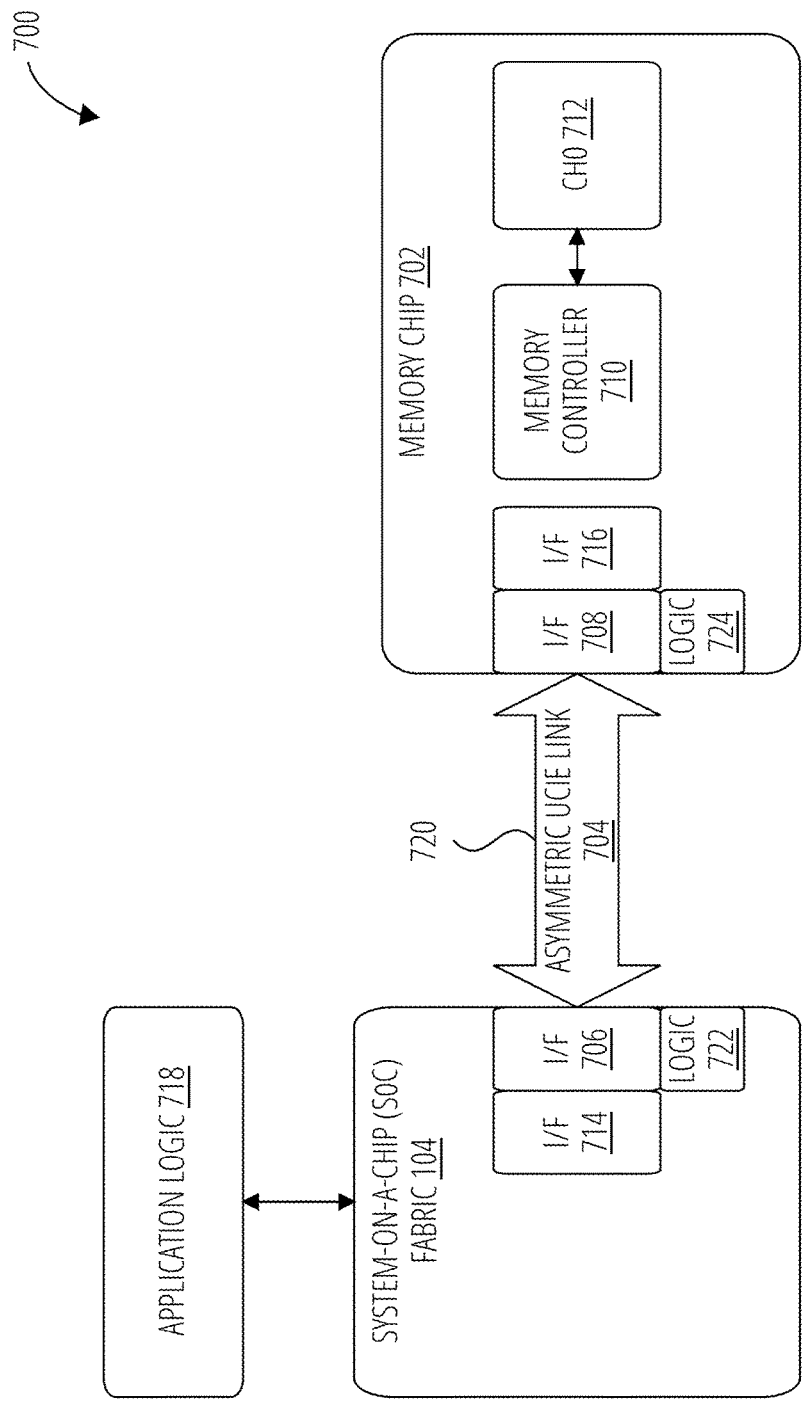
FIG. 7 illustrates a sixth system in accordance with one embodiment.

FIG. 7 illustrates a system 700. System 700 is an example of a memory subsystem disaggregation technique for transporting memory signals over a UCIe interconnect. System 700 illustrates decoupling of a SoC fabric (e.g., SoC fabric 104) with an on-package memory subsystem.

In certain applications, it would be useful to provide a higher-level abstraction for die disaggregation. This can allow independent scaling of in-package memory versus a SOC fabric to quickly repackage for different stock keeping units (SKUs) or applications. It can also allow mixing and matching different memory technologies with the same SOC fabric. The growing ecosystem around CXL.mem IPs provides a good abstraction layer to enable that protocol for these applications.

As depicted in FIG. 7, a SoC fabric 104 includes a UCIe interface 706 with interface logic 722 to transport information over a UCIe interconnect 720 that implements an asymmetric UCIe link 704. The interface logic 722 manages transport of data over the UCIe interconnect 720 in a transmit mode to a memory chip 702. The interface logic 722 decodes memory signals from a memory interface 714 of the SoC fabric 104. In one embodiment, for example, the memory signals are compute express link (CXL) memory signals. The interface logic 722 maps the memory signals to UCIe signals, and encodes the UCIe signals for transmission over the asymmetric UCIe link 704 of the UCIe interconnect 720 via a UCIe interface 706.

The SoC fabric 104 includes the interface logic 722 to manage transport of data over the UCIe interconnect 720 in a receive mode from the memory chip 702. The interface logic 722 decodes UCIe signals from the asymmetric UCIe link 704 of the UCIe interconnect 720. The UCIe signals may be encoded UCIe signals representing memory signals from the memory unit CH0 712 via the memory controller 710, the memory interface 716, and the UCIe interface 708. The UCIe interface 708 transports the UCIe signals over the asymmetric UCIe link 704 of the UCIe interconnect 720. The UCIe interface 706 maps the received UCIe signals to memory signals, and encodes the memory signals for transmission over the SoC fabric 104 via the memory interface 714. The SoC fabric 104 routes the memory signals to a component of the SoC 118, such a processor 102 or application logic 718.

The UCIe interface 708, memory interface 716, and interface logic 724 operate in a manner similar to corresponding UCIe interface 706, memory interface 714, and interface logic 722, respectively. The UCIe interface 708, memory interface 716, and interface logic 724 encodes UCIe signals representative of memory signals from the memory controller 710 and the memory unit CH0 712, and decodes UCIe signals representative of memory signals from the SoC fabric 104.

Figure 8:
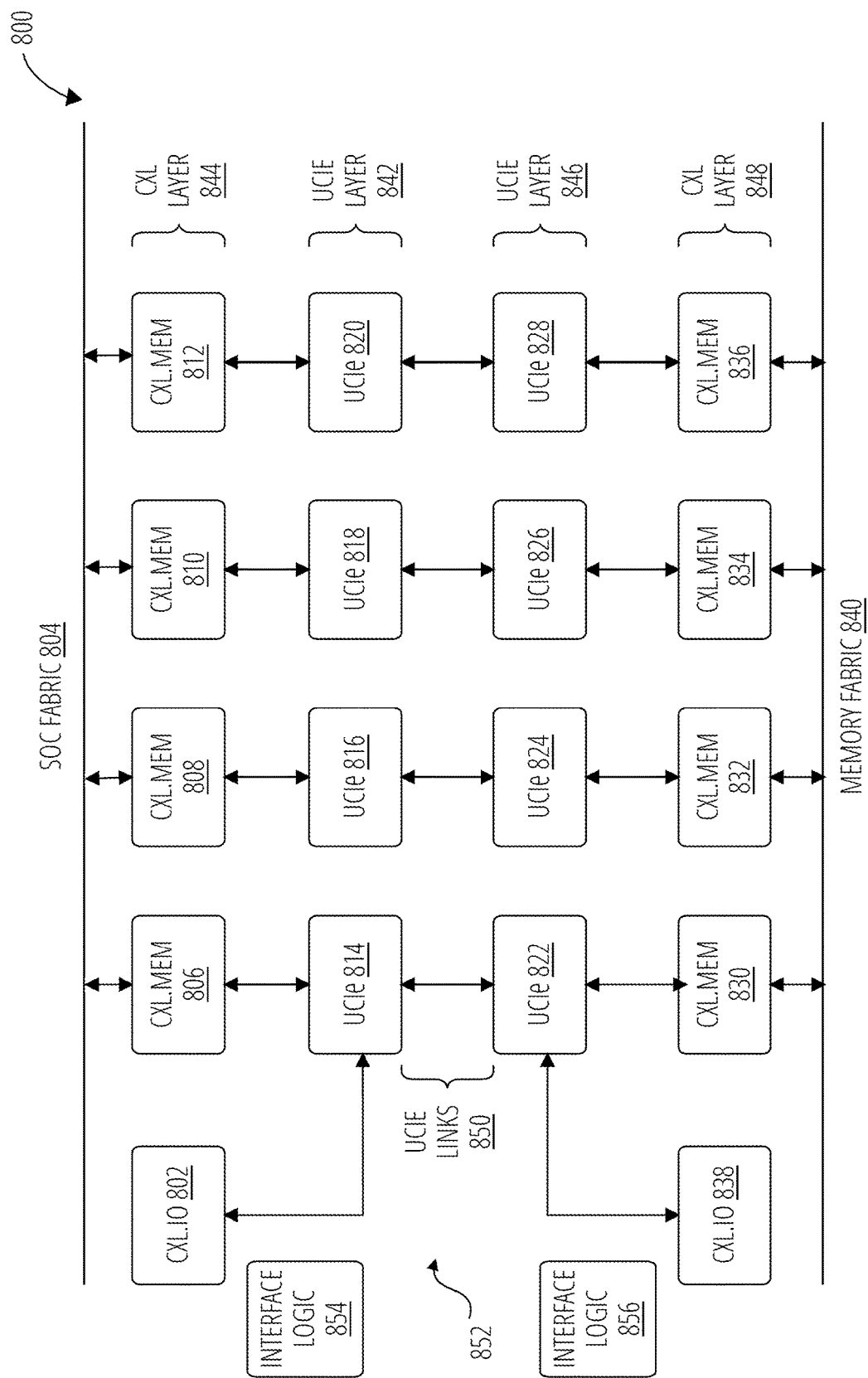
FIG. 8 illustrates a seventh system in accordance with one embodiment.

FIG. 8 illustrates a system 800. The system 800 is an example of memory subsystem disaggregation for memory signals, such as CXL memory signals as defined by the CXL.mem protocol.

In legacy implementations, a legacy CXL stack may require the full support of the CXL.io protocol along with CXL.mem for every link. Moreover, CXL.io may be required to support at least 50% of the maximum bandwidth of the link. For a die-disaggregation application, the primary protocol is CXL.mem, whereas the CXL.io protocol may only be needed for configuration input/output (CFG/IO) transactions, messages and message signaled interrupts (MSIs). Those may be considered sufficient for device discovery and enumeration along with error reporting capabilities.

To enable the above without carrying the overhead of the entire CXL.io stack for every Link, embodiments may setup the system as shown in FIG. 8. CXL.io transactions may be packetized by sending their transaction layer packets (TLPs) inside the data payload of UCIe vendor defined messages (VDMs). Each UCIe sideband packet may carry 64b or 2 data words (DWords or DW) of data. However, some embodiments may introduce operational codes (opcodes) that can carry up to 8 DWs of data, allowing for 4DW TLP header and 4DW TLP data to be sent with a single UCIe VDM. Only update flow control (FC) (UpdateFC) data link layer packets (DLLPs) (UpdateFC DLLPs) may be allowed, and they may be tunneled using a similar mechanism as TLPs. No DLLP initialization protocol may be required.

Initial credits are implicitly assumed to be 1 for each type of header credit (P, NP, C) for a virtual channel (VC) 0 (VC0), and 1 for each type of data credit. Only single VC support is permitted. Device discovery and enumeration may follow the "Ganged Links" topology from CXL, allowing multiple CXL.mem UCIe links to be associated with a single CXL.io path.

For CXL.mem, mainband data flow may use the latency optimized flow control unit (FCU) level interface transaction (FLITs) defined in the legacy UCIe specification. The number of links may be asymmetric. For instance, a memory fabric 840 to SoC fabric 804 may have more UCIe links than the SoC fabric 804 to the memory fabric 840. The asymmetric links may optimize for 2 read, 1 write (2r1w) workloads. The SoC fabric 804 may perform address-based hash to determine to which UCIe link transactions should be transmitted. Unique tag encodings/bits may be used to determine how to return completions back to the originator regardless of which UCIe Link the completion came back on.

In some embodiments, this kind of extension may be useful for traditional CXL SERDES (off package) stacks as well. This will be enabled in the CXL specification. It may be negotiated during link training as part of the modified transaction sequence (TS) bit 1 (TS1) and/or TS bit 2 (TS2) to identify whether this functionality is supported and whether that link carries CXL.io or not. Because there may be no sideband for off-package SERDES, embodiments may still use CXL.io FLITs to send the TLPs, however the simplifications above in terms of limited flow control and feature set, along with only one of the links having to carry this, may still be applicable.

The system 800 is an example of memory subsystem disaggregation for memory signals, such as CXL memory signals as defined by the CXL.mem protocol. As depicted in FIG. 8, the system 800 comprises a SoC fabric 804 in communication with a memory fabric 840 over a set of UCIe links 850 of a UCIe interconnect 852. The SoC fabric 804 communicates memory signals to the memory fabric 840, and vice-versa.

As depicted in FIG. 8, the UCIe interconnect 852 may comprise multiple UCIe links 850. For example, the system 800 comprises 4 UCIe links 850 by way of example and not limitation. Each of the 4 UCIe links 850 may comprise a channel or lane between the SoC fabric 804 and the memory fabric 840. For example, a first UCIe link comprises a CXL.mem 806, a UCIe 814, a UCIe 816 and a CXL.mem 830. A second UCIe link comprises a CXL.mem 808, a UCIe 816, a UCIe 824 and a CXL.mem 832. A third UCIe link comprises a CXL.mem 810, a UCIe 818, a UCIe 826 and a CXL.mem 834. A fourth UCIe link comprises a CXL.mem 812, a UCIe 820, a UCIe 828 and a CXL.mem 836. The CXL.mem 806, CXL.mem 808, CXL.mem 810 and CXL.mem 812 comprise a first CXL layer 844. The CXL.mem 830, CXL.mem 832, CXL.mem 834 and CXL.mem 836 comprise a second CXL layer 848. The UCIe 814, UCIe 816, UCIe 818 and UCIe 820 comprise a first UCIe layer 842. The UCIe 822, UCIe 824, UCIe 826 and UCIe 828 comprise a second UCIe layer 846.

In one embodiment, the SoC fabric 804 and the memory fabric 840 communicate memory signals comprising CXL signals, such as CXL.mem signals in accordance with the CXL.mem protocol. The CXL signals may comprise, for example, CXL command and data timing signals for a CXL memory interface, implemented as the CXL layer 844 and the CXL layer 848. The interface logic 854 maps CXL command and data timing signals for a CXL memory interface to UCIe command and data timing signals for a UCIe adapter and physical layer (PHY) interface, implemented as the UCIe layer 842 and the UCIe layer 846. Conversely, an interface logic 856 maps UCIe command and data timing signals for the UCIe adapter and PHY interface to CXL command and data timing signals for the CXL memory interface.

The CXL.io 802 and the CXL.io 838 perform CXL.io transactions. The CXL.io transactions may be packetized by sending their transaction layer packets (TLPs) inside the data payload of UCIe vendor defined messages (VDMs). Each UCIe sideband packet may carry 64b or 2 data words (DWords or DW) of data.

Figure 9:
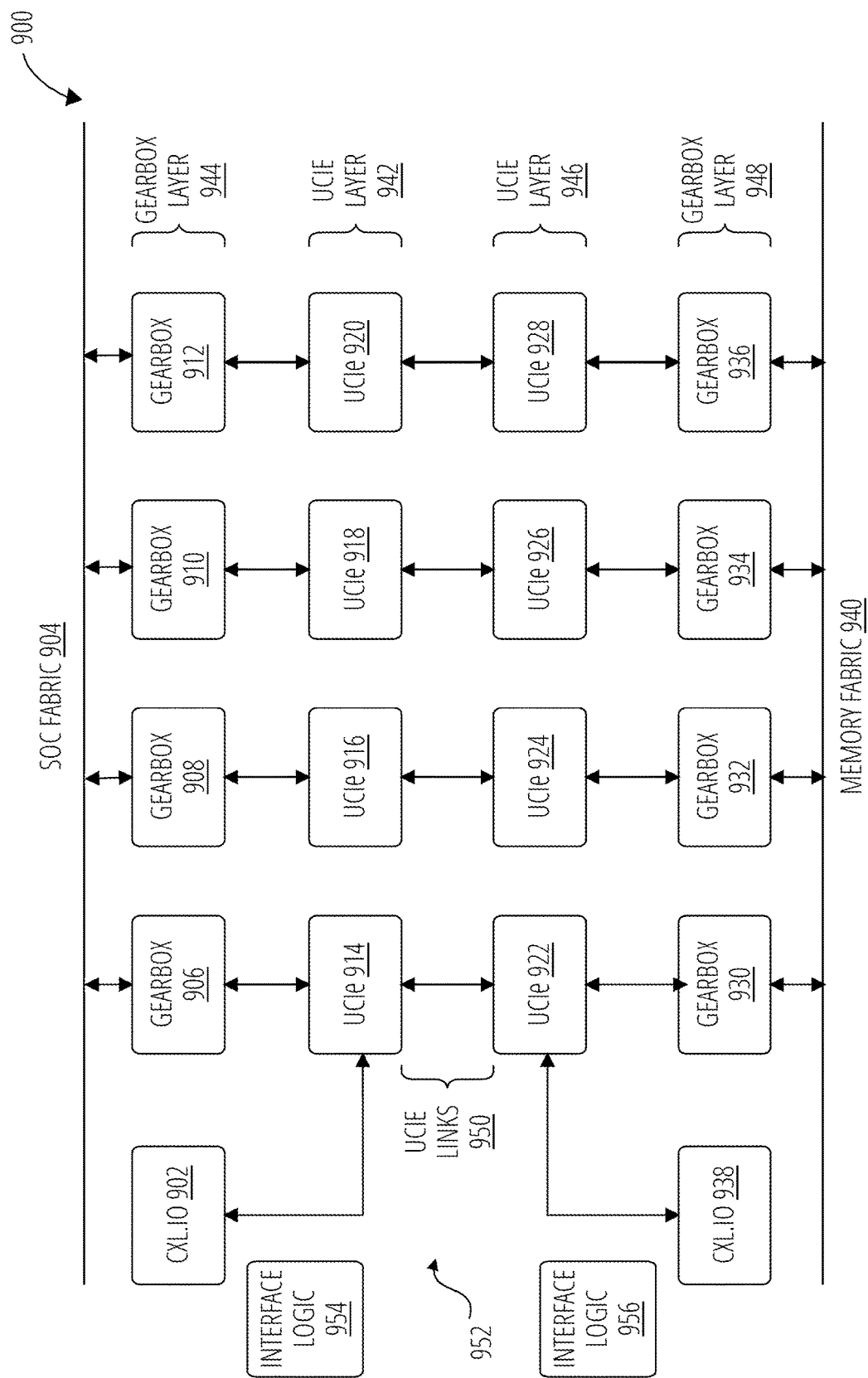
FIG. 9 illustrates an eighth system in accordance with one embodiment.

FIG. 9 illustrates a system 900. The system 900 may be similar to the system 800. However, the system 900 replaces the CXL.mem blocks in the CXL layer 844 and the CXL layer 848 of system 800 with gearboxes.

With respect to die-disaggregation applications, embodiments improve on this stack in terms of loaded latency and area by going one step further and eliminating the packing/unpacking overhead of sending information as CXL.mem FLITs. Instead, embodiments may give dedicated lanes for sending CXL.mem commands (e.g., sent as 16B slots) and dedicated lanes for sending data. Given the improving densities and power efficiencies of an advanced package UCIe, this trade-off may be worthwhile for high performance computing (HPC) applications. An example of this is shown in the system 900.

With a SoC fabric 904 interface that is a compute plug-in (CPI) or something similar, typically the command and data may be carried independently. Using a gearbox to serialize/deserialize the commands and data independently, embodiments may significantly lower the packing/unpacking delays. In some embodiments, for example, these delays are lowered on the order of approximately ~15 ns lower.

As depicted in FIG. 9, for example, the system 900 may have a gearbox in each of the UCIe links 950 of a UCIe interconnect 952. For example, a first UCIe link comprises a gearbox 906, a UCIe 914, a UCIe 922 and a gearbox 930. A second UCIe link comprises a gearbox 908, a UCIe 916, a UCIe 924 and a gearbox 932. A third UCIe link comprises a gearbox 910, a UCIe 918, a UCIe 926 and a gearbox 934. A fourth UCIe link comprises a gearbox 912, a UCIe 920, a UCIe 928 and a gearbox 936. The gearbox 906, gearbox 908, gearbox 910 and gearbox 912 comprise a first gearbox layer 944. The gearbox 930, gearbox 932, gearbox 934 and gearbox 936 comprise a second gearbox layer 948. The UCIe 914, UCIe 916, UCIe 918 and UCIe 920 comprise a first UCIe layer 942. The UCIe 922, UCIe 924, UCIe 926 and UCIe 928 comprise a second UCIe layer 946.

In one embodiment, the SoC fabric 904 and the memory fabric 940 communicate memory signals comprising CXL signals, such as CXL.mem signals in accordance with the CXL.mem protocol. The CXL signals may comprise, for example, CXL command and data timing signals for a CXL memory interface, implemented as the gearbox layer 944 and the gearbox layer 948. The interface logic 954 maps CXL command and data timing signals for a CXL memory interface to UCIe command and data timing signals for a UCIe adapter and physical layer (PHY) interface, implemented as the UCIe layer 942 and the UCIe layer 946. Conversely, an interface logic 956 maps UCIe command and data timing signals for the UCIe adapter and PHY interface to CXL command and data timing signals for the CXL memory interface.

The CXL.io 902 and the CXL.io 938 perform CXL.io transactions. The CXL.io transactions may be packetized by sending their transaction layer packets (TLPs) inside the data payload of UCIe vendor defined messages (VDMs). Each UCIe sideband packet may carry 64b or 2 data words (DWords or DW) of data.

Figure 10:
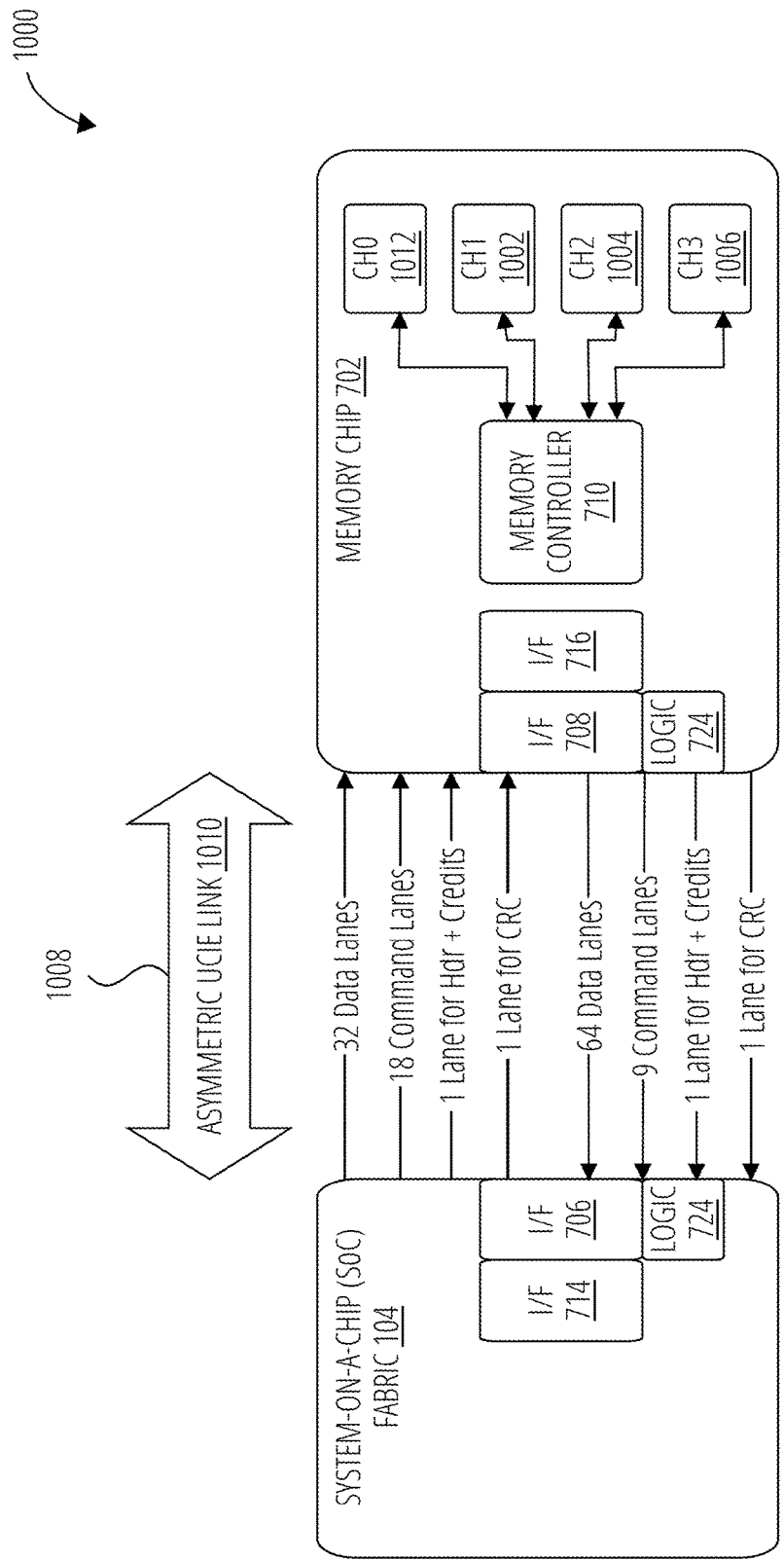
FIG. 10 illustrates a ninth system in accordance with one embodiment.

FIG. 10 illustrates a system 1000. The system 1000 illustrates an example of an asymmetric UCIe link 1010 for memory subsystem disaggregation within a semiconductor package. The system 1000 may be similar to the system 700. However, the system 1000 implements a UCIe interconnect 1008 that implements an asymmetric UCIe link 1010 having multiple UCIe links or lanes.

Flow control may be directly into the SOC or memory fabric bridges, thus saving on the transaction layer queues and so forth. The UCIe lane mapping may be arranged to carry an equivalent bandwidth of 4 channels of LPDDR5 assuming UCIe is running at 16GT/s. FIG. 10 shows an example pictorial representation of this arrangement.

The system 1000 may comprise a SoC fabric 104 and a memory chip 702 as described with reference to system 700. The SoC fabric 104 comprises a memory interface 714 and a UCIe interface 706 and associated interface logic 724. The memory chip 702 comprises a memory controller 710 in communication with memory unit CH0 712 (e.g., memory unit CH0 1012), memory unit CH1 1002, memory unit CH2 1004 and memory unit CH3 1006. The memory controller 710 (or alternatively a memory fabric) may communicate with the memory units over a memory protocol bus, such as a DFI bus to carry DFI signals. The SoC fabric 104 and memory chip 702 may communicate memory signals as UCIe signals over the UCIe interconnect 1008 that implements the asymmetric UCIe link 1010 using multiple lanes.

From the SoC fabric 104 to the memory chip 702, for example, the asymmetric UCIe link 1010 may comprise or implement 32 lanes of data with 2 valid frames to send 64B of data. The asymmetric UCIe link 1010 implements 18 lanes of command, with 3 commands in parallel and with 6 lanes per command. Thus, it can carry 2 read and 1 write (2r1w) commands in parallel. The asymmetric UCIe link 1010 implements 1 lane for header (HDR) and credit returns, where the header carries acknowledge (ack) and no acknowledgment (nak) and sequence number information for retries. The asymmetric UCIe link 1010 implements 1 lane for CRC, with 2B CRC over command and data per 2 valid frames delayed by 1 valid frame to save latency.

From the memory chip 702 to the SoC fabric 104, for example, the asymmetric UCIe link 1010 may comprise implement 64 lanes of data with 2 read responses in parallel. The asymmetric UCIe link 1010 implements 9 lanes of command, with 2 data response headers and 1 write completion header in parallel. The asymmetric UCIe link 1010 implements 1 lane for header and credit returns, and 1 lane for CRC.

In one embodiment, for example, the system 1000 includes the interface logic 724 to encode the UCIe signals for transmission over the asymmetric UCIe link 1010 of the UCIe interconnect 1008 to the memory chip 702 in a same package as the SoC fabric 104. The interface logic 722 decodes the UCIe signals from the asymmetric UCIe link 1010 of the UCIe interconnect 1008 from the memory chip 702 in the same package as the SoC fabric 104. The interface logic 724 performs similar operations on behalf of the memory chip 702.

In one embodiment, for example, the interface logic 722 may also encode CRC or ECC signals for the UCIe signals for transmission over the asymmetric UCIe link 1010 of the UCIe interconnect 1008, and decode the CRC signals or ECC signals for the UCIe signals from the asymmetric UCIe link 1010 of the UCIe interconnect 1008.

In one embodiment, for example, the interface logic 722 encodes the UCIe signals for transmission over multiple transmit channels of the asymmetric UCIe link 1010 of the UCIe interconnect 1008, and decodes the UCIe signals from multiple receive channels of the asymmetric UCIe link 1010 of the UCIe interconnect 1008.

In one embodiment, for example, the interface logic 722 encodes CXL.io signals for the UCIe signals for transmission over the asymmetric UCIe link 1010 of the UCIe interconnect 1008, and decodes the CXL.io signals for the UCIe signals from the asymmetric UCIe link 1010 of the UCIe interconnect 1008.

Figure 11:
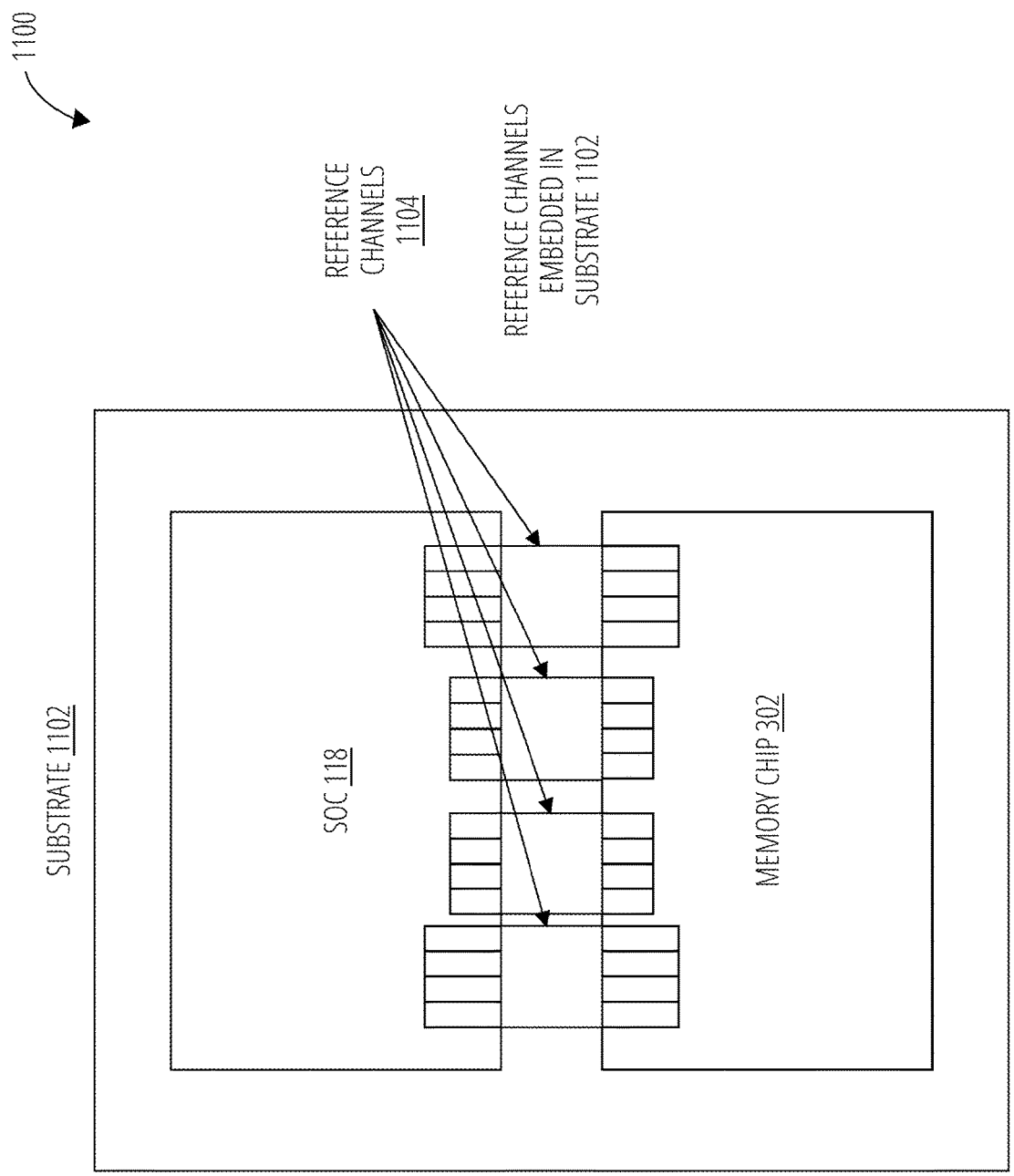
FIG. 11 illustrates a top view of a semiconductor package in accordance with one embodiment.

FIG. 11 illustrates a semiconductor package 1100. The semiconductor package 1100 includes the SoC 118 and the memory chip 302 assembled on a substrate 1102. The SoC 118 and the memory chip 302 may communicate over a set of reference channels 1104. In one embodiment, the reference channels 1104 are embedded in the substrate 1102. The reference channels 1104 may be implemented as wire bonds, traces, a silicon bridge, interposer, and other communications media.

The semiconductor package 1100 may have different physical configurations for semiconductor testing, with the different physical configurations defined using different reference packages, such as a strict reference package and form factor, a flexible reference package and form factor, and a custom reference package for an OEM.

Figure 12:
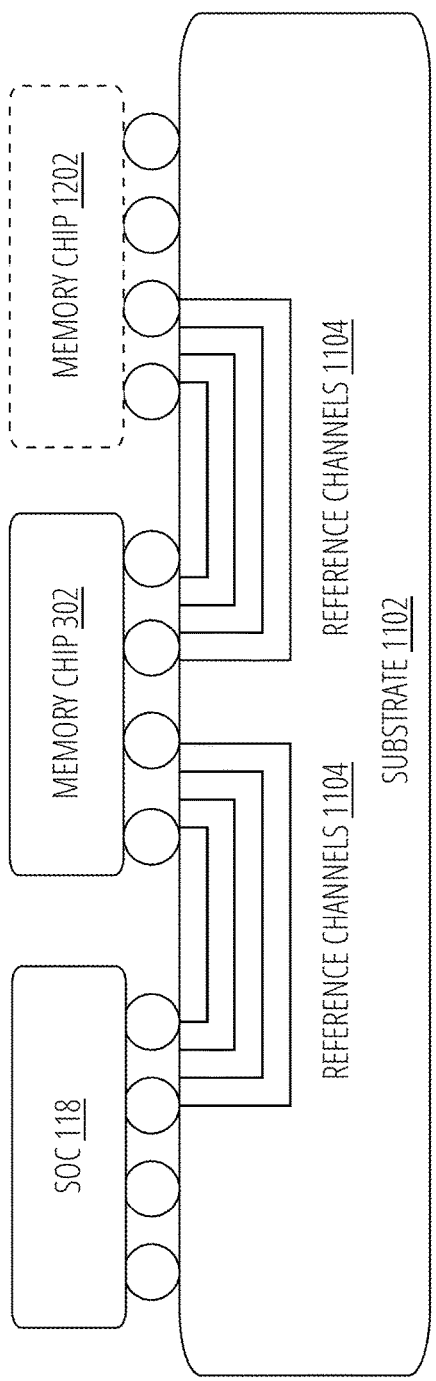
FIG. 12 illustrates a standard package in accordance with one embodiment.

FIG. 12 illustrates a standard package 1200. The UCIe Specification defines two types of packaging. The standard package 1200 is an example of a standard package (2D) that is used for cost effective performance. There are multiple commercially available options, some of which are shown in the diagram. The UCIe Specification embraces all types of packaging choices in these categories.

In one embodiment, the semiconductor package 1100 may be instantiated as a standard package 1200. This allows the semiconductor package 1100 to be tested as it would be deployed in commercially available options.

The standard package 1200 may illustrate the SoC 118 and the memory chip 302 assembled on the substrate 1102. The substrate may have embedded a set of reference channels 1104. The reference channels 1104 may be conductive path between the SoC 118 and the memory chip 302. The standard package 1200 may optionally include a memory chip 1202. The memory chip 1202 may comprise another memory chip for the parallel configuration or daisy-chain configuration as previously discussed. Embodiments are not limited in this context.

Figure 13:
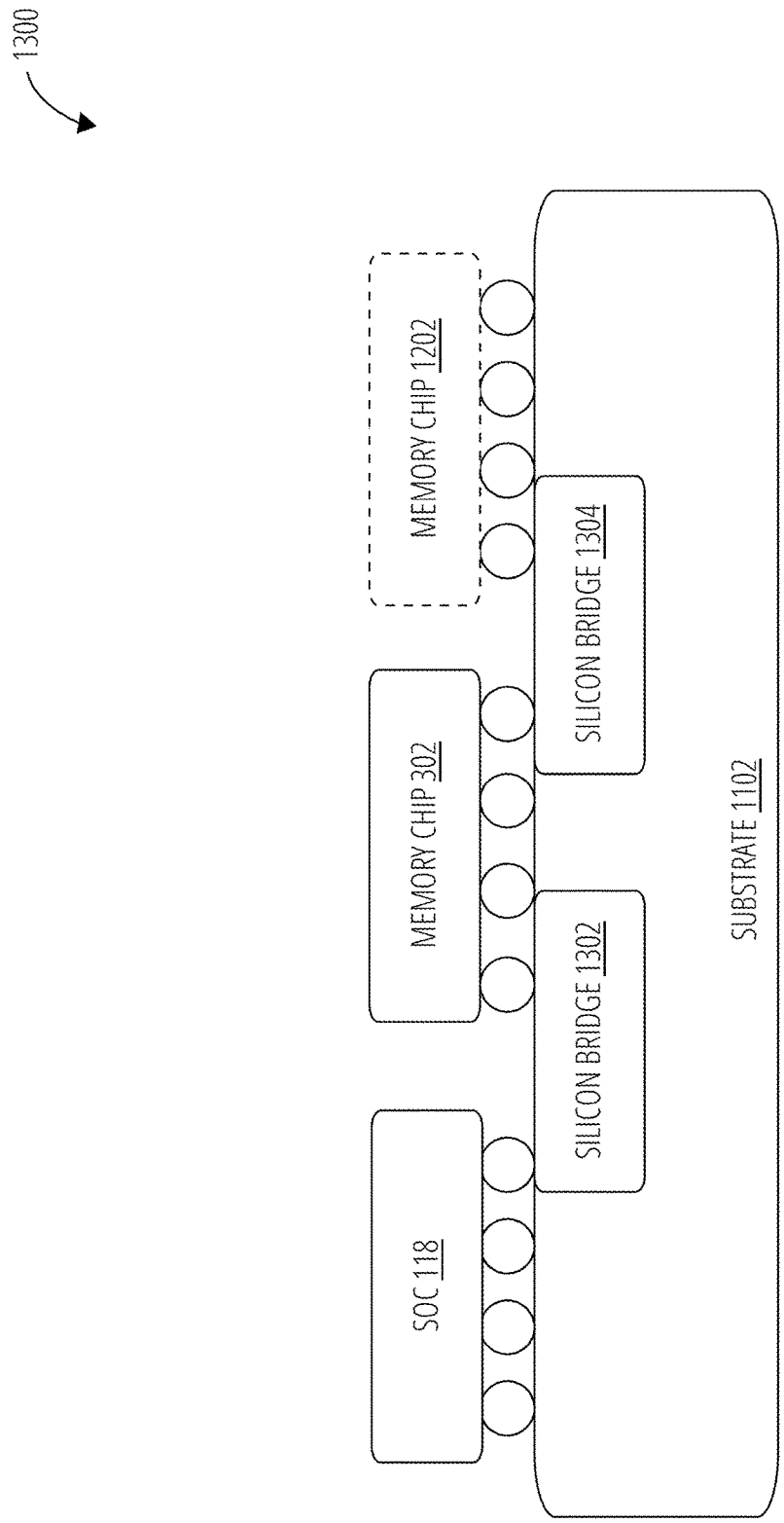
FIG. 13 illustrates a first advanced package in accordance with one embodiment.

FIG. 13 illustrates an advanced package 1300. As previously discussed, the UCIe Specification defines two types of packaging. The standard package 1200 is an example of a standard package (2D) that is used for cost effective performance. The advanced package 1300 is an example of a more advanced package that is used for power-efficient performance. There are multiple commercially available options for an advanced package, and the advanced package 1300 is one commercially available option. The UCIe Specification embraces all types of packaging choices in these categories.

In one embodiment, the semiconductor package 1100 may be instantiated as the advanced package 1300. This allows the semiconductor package 1100 to be deployed in commercially available options.

The advanced package 1300 may illustrate the SoC 118 and the memory chip 302 assembled on the substrate 1102. Instead of the substrate 1102 having an embedded set of reference channels 1104, however, the substrate 1102 may implement a silicon bridge 1302 and/or a silicon bridge 1304.

The silicon bridge 1302 and/or the silicon bridge 1304 may contain the reference channels 1104 as a conductive path between the SoC 118 and the memory chip 302. In general, a silicon bridge in a substrate refers to a structure in which a layer of silicon material is used to connect two or more isolated regions or components on a substrate. The silicon bridge is typically formed using semiconductor processing techniques such as photolithography, etching, and deposition. Silicon bridges 1302, 1304 can be used to create electrical connections between isolated components on a substrate, such as the SoC 118 and the memory chip 302, which can be useful for integrating multiple functions or devices on a single chip. Silicon bridges can also be used to isolate or separate different regions on a substrate. For example, a silicon bridge might be used to create a barrier between different types of materials, such as a metal layer and a silicon layer, to prevent unwanted interactions or contamination.

The advanced package 1300 may optionally include a memory chip 1202. The memory chip 1202 may comprise another memory chip for the parallel configuration or daisy-chain configuration as previously discussed. Embodiments are not limited in this context. Embodiments are not limited in this context.

Figure 14:
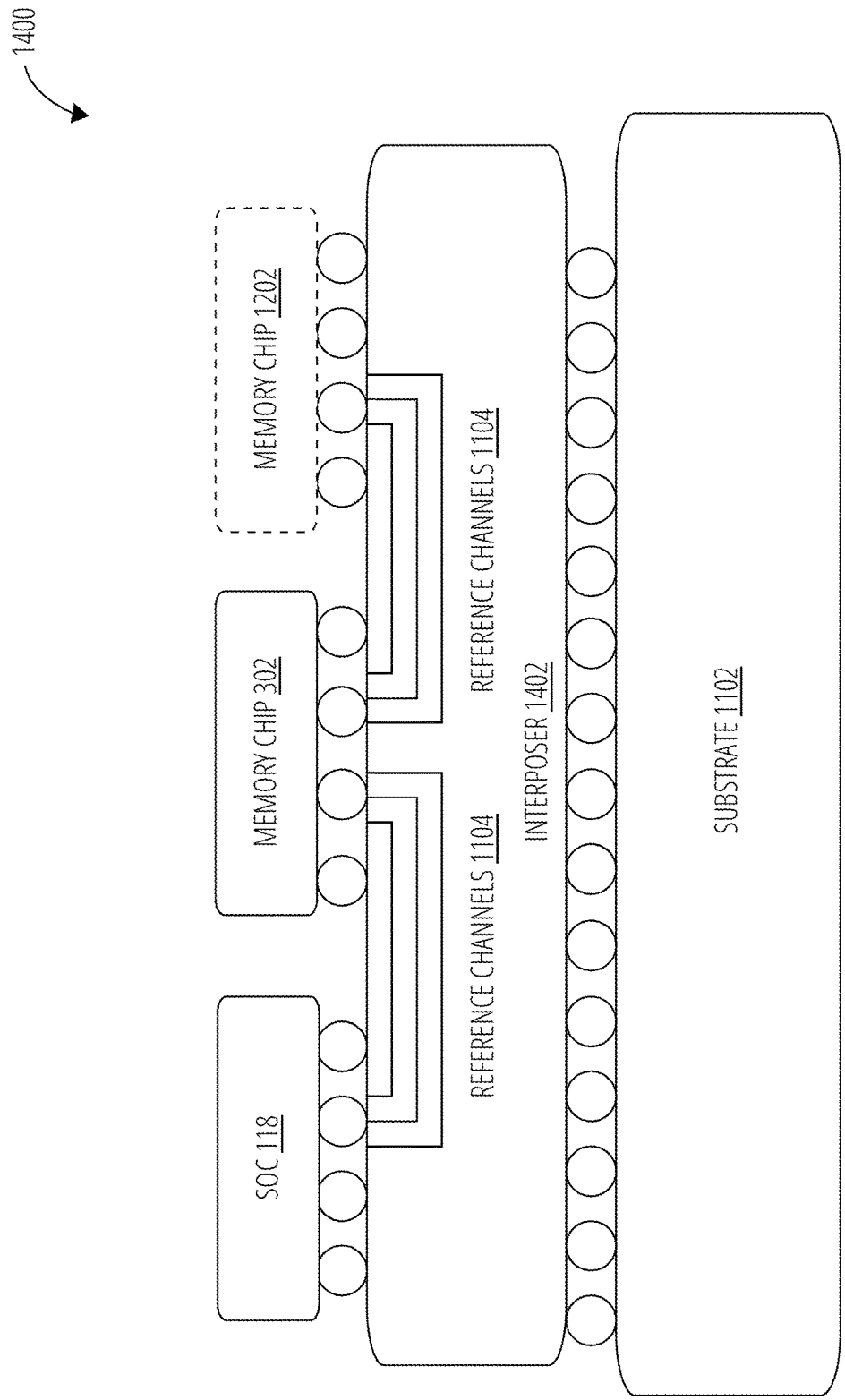
FIG. 14 illustrates a second advanced package in accordance with one embodiment.

FIG. 14 illustrates an advanced package 1400. The UCIe Specification defines two types of packaging. The advanced package 1400 is an advanced package (2.5D) that is used for power-efficient performance. There are multiple commercially available options for the advanced package.

The advanced package 1400 is another example of a more advanced package that is used for power-efficient performance. In one embodiment, the semiconductor package 1100 may be instantiated as the advanced package 1400. This allows the semiconductor package 1100 to be deployed in commercially available options.

The advanced package 1400 may illustrate the SoC 118 and the memory chip 302 assembled on an interposer 1402. The interposer 1402 may have an embedded set of reference channels 1104. The interposer 1402 may be assembled on the substrate 1102.

The interposer 1402 is an electronic component that acts as an interface between a chip or integrated circuit and its package or substrate. An interposer provides a connection between the chip and the package by routing electrical signals between them. The interposer is typically a thin piece of material, such as silicon or organic substrate, that contains a network of electrical traces or vias. These traces are used to route signals between the chip and the package, and may also include power and ground connections. The interposer may be used in advanced packaging technologies such as 2.5D and 3D packaging, where multiple chips are stacked on top of each other to increase performance and reduce the overall size of the package. By using the interposer 1402, the chips can be connected to each other and to the package substrate 1102 without the need for wire bonding or flip-chip packaging. The interposer may also enable heterogeneous integration, where chips with different technologies, such as CPUs and memory, can be integrated into a single package. This allows for improved performance, power efficiency, and reduced cost compared to traditional packaging technologies.

The advanced package 1400 may optionally include a memory chip 1202. The memory chip 1202 may comprise another memory chip for the parallel configuration or daisy-chain configuration as previously discussed. Embodiments are not limited in this context.

Figure 15:
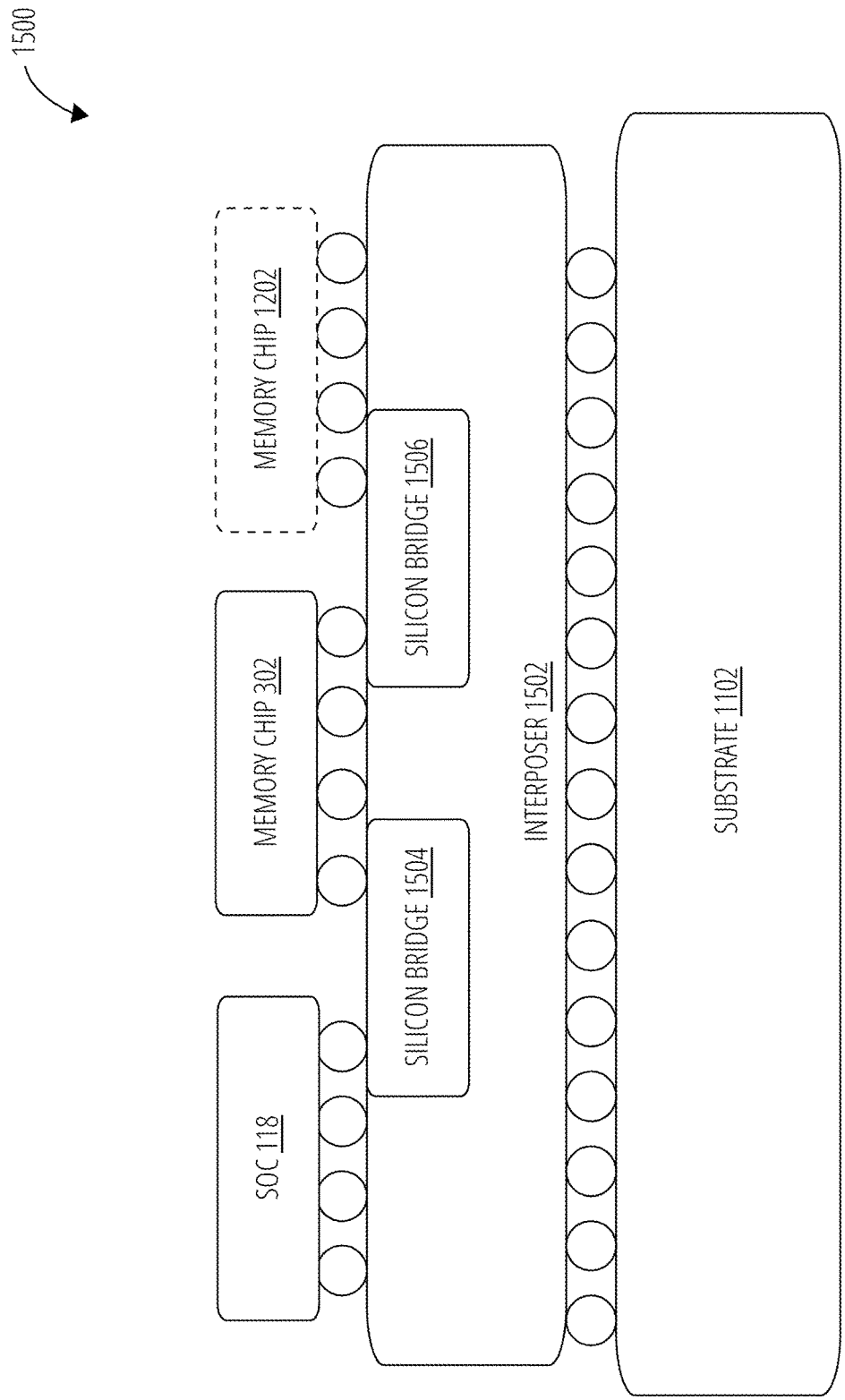
FIG. 15 illustrates a third advanced package in accordance with one embodiment.

FIG. 15 illustrates an advanced package 1500. The UCIe Specification defines two types of packaging. The advanced package 1500 is an advanced package (2.5D or 3D) that is used for power-efficient performance. There are multiple commercially available options for the advanced package.

The advanced package 1500 is yet another example of a more advanced package that is used for power-efficient performance. In one embodiment, the semiconductor package 1100 may be instantiated as the advanced package 1500. This allows the semiconductor package 1100 to be tested as it would be deployed in commercially available options.

The advanced package 1500 may illustrate the SoC 118 and the memory chip 302 assembled on an interposer 1502. The interposer 1502 may embed a silicon bridge 1504 and/or a silicon bridge 1506 with reference channels 1104. The silicon bridge 1504 and silicon bridge 1506 may be similar to the silicon bridge 1302 and silicon bridge 1304 as described with reference to FIG. 13. The interposer 1502 may be assembled on the substrate 1102.

The advanced package 1500 may optionally include a memory chip 1202. The memory chip 1202 may comprise another memory chip for the parallel configuration or daisy-chain configuration as previously discussed. Embodiments are not limited in this context.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 16:
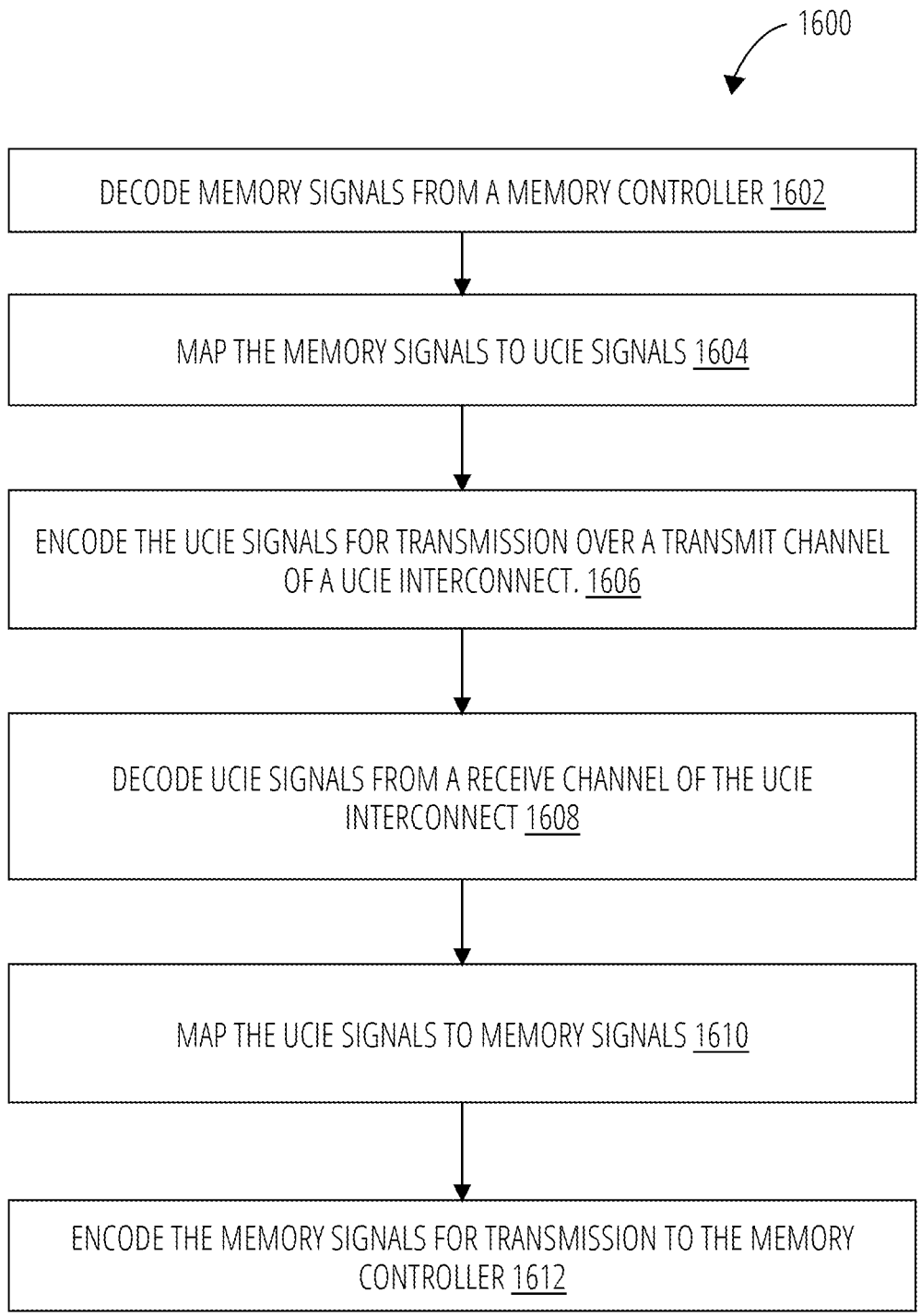
FIG. 16 illustrates a first logic flow in accordance with one embodiment.

FIG. 16 illustrates an embodiment of a logic flow 1600. The logic flow 1600 may be representative of some or all of the operations executed by one or more embodiments described herein. For example, the logic flow 1600 may include some or all of the operations performed by devices or entities described herein. More particularly, the logic flow 1600 illustrates an example where the SoC 118 and the memory chip 302 communicate memory signals over a UCIe interconnect 304.

In block 1602, the logic flow 1600 decodes memory signals from a memory controller. In block 1604, the logic flow 1600 maps the memory signals to UCIe signals. In block 1606, the logic flow 1600 encodes the UCIe signals for transmission over a transmit channel of a UCIe interconnect. In block 1608, the logic flow 1600 decodes UCIe signals from a receive channel of the UCIe interconnect. In block 1610, the logic flow 1600 maps the UCIe signals to memory signals. In block 1612, the logic flow 1600 encodes the memory signals for transmission to the memory controller.

By way of example, with reference to the SoC 118 and the memory chip 302 of system 300, the SoC 118 includes a memory controller 122 and a UCIe interconnect 304. The UCIe interconnect 304 includes interface logic 322 to manage transport of data over the UCIe interconnect 304 in a transmit mode and a receive mode. In the transmit mode, the interface logic 322 decodes memory signals from the memory controller 122, maps the memory signals to UCIe signals, and encodes the UCIe signals for transmission over a transmit channel 318 of the UCIe interconnect 304 via the UCIe interface 308. In the receive mode, the interface logic 322 decodes UCIe signals from a receive channel 320 of the UCIe interconnect 304, maps the UCIe signals to memory signals, and encodes the memory signals for transmission to the memory controller 122.

Figure 17:
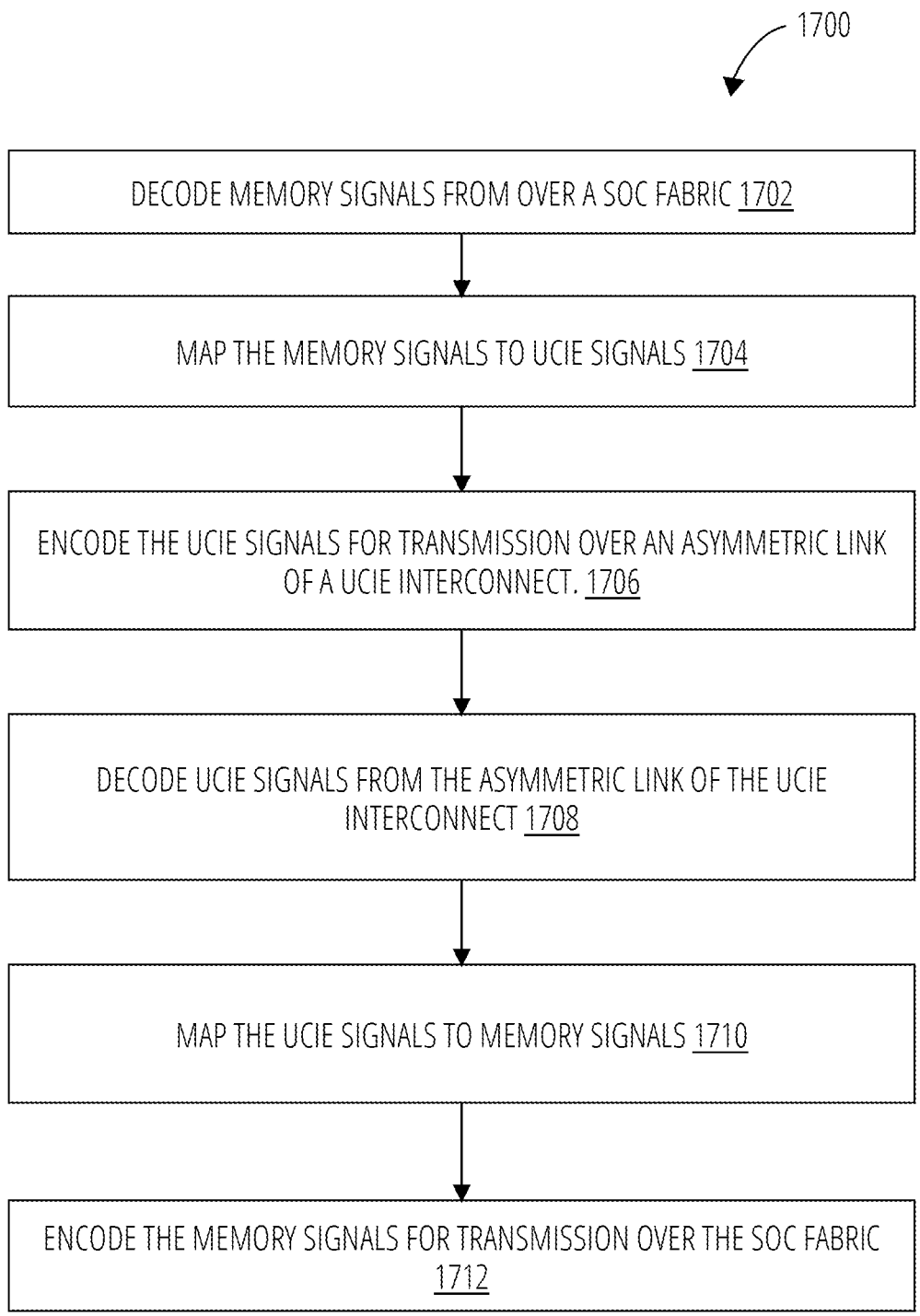
FIG. 17 illustrates a second logic flow in accordance with one embodiment.

FIG. 17 illustrates an embodiment of a logic flow 1700. The logic flow 1700 may be representative of some or all of the operations executed by one or more embodiments described herein. For example, the logic flow 1700 may include some or all of the operations performed by devices or entities described herein. More particularly, the logic flow 1700 illustrates an example where the SoC fabric 104 and the memory chip 702 communicate memory signals over a UCIe interconnect 720 that implements an asymmetric UCIe link 704.

In block 1702, the logic flow 1700 decodes memory signals from over a SoC fabric. In block 1704, the logic flow 1700 maps the memory signals to UCIe signals. In block 1706, the logic flow 1700 encodes the UCIe signals for transmission over an asymmetric link of a UCIe interconnect. In block 1708, the logic flow 1700 decodes UCIe signals from the asymmetric link of the UCIe interconnect. In block 1710, the logic flow 1700 maps the UCIe signals to memory signals. In block 1712, the logic flow 1700 encodes the memory signals for transmission over the SoC fabric.

By way of example, with reference to the SoC fabric 104 and UCIe interconnect 720 of system 700, the UCIe interconnect 720 includes interface logic 722 to manage transport of data over the UCIe interconnect 720 in a transmit mode and a receive mode. In the transmit mode, the interface logic 722 decodes memory signals from over the SoC fabric 104, maps the memory signals to UCIe signals, and encodes the UCIe signals for transmission over an asymmetric UCIe link 704 of the UCIe interconnect 720. In the receive mode, the interface logic 722 decodes UCIe signals from the asymmetric UCIe link 704 of the UCIe interconnect 720, maps the UCIe signals to memory signals, and encodes the memory signals for transmission over the SoC fabric 104.

Figure 18:
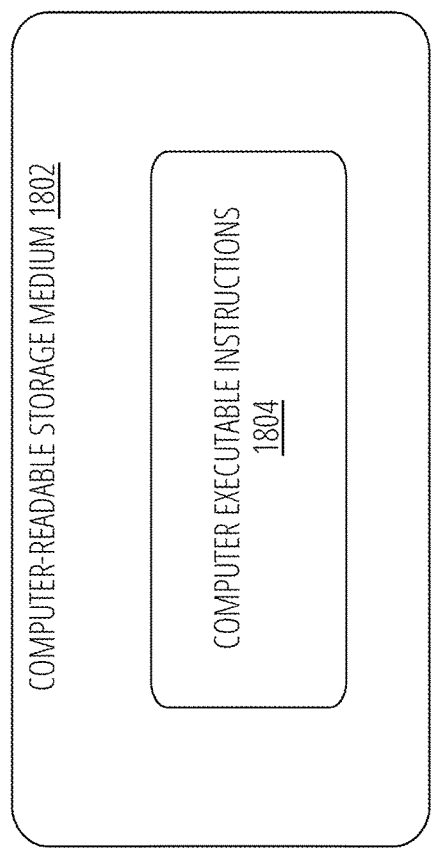
FIG. 18 illustrates computer-readable storage medium in accordance with one embodiment.

FIG. 18 illustrates an apparatus 1800. Apparatus 1800 may comprise any non-transitory computer-readable storage medium 1802 or machine-readable storage medium, such as an optical, magnetic or semiconductor storage medium. In various embodiments, apparatus 1800 may comprise an article of manufacture or a product. In some embodiments, the computer-readable storage medium 1802 may store computer executable instructions with which circuitry can execute. For example, computer executable instructions 1804 can include instructions to implement operations described with respect to any logic flows described herein. Examples of computer-readable storage medium 1802 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1804 may include any suitable type of code, such as source code, compiled code, interpreted code, executable code, static code, dynamic code, object-oriented code, visual code, and the like.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-18 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

The following examples pertain to further embodiments, from which numerous permutations and configurations will be apparent.

A first example apparatus comprises a system-on-a-chip (SoC) comprising a memory controller and a universal chiplet interconnect express (UCIe) interconnect, the UCIe interconnect comprising interface logic to manage transport of data over the UCIe interconnect in a transmit mode, the interface logic to: decode memory signals from the memory controller; map the memory signals to UCIe signals; and encode the UCIe signals for transmission over a transmit channel of the UCIe interconnect.

The first example apparatus further comprising the interface logic to manage transport of data over the UCIe interconnect in a receive mode, the interface logic to: decode UCIe signals from a receive channel of the UCIe interconnect; map the UCIe signals to memory signals; and encode the memory signals for transmission to the memory controller.

The first example apparatus further comprising any of the previous examples, including where the memory signals are double data rate (DDR) memory signals or high bandwidth memory (HBM) memory signals.

The first example apparatus further comprising any of the previous examples, including where the memory signals comprise double data rate (DDR) physical layer (PHY) interface (DFI) signals, and the interface logic to: map DFI command and data timing signals to UCIe command and data timing signals for a UCIe PHY interface; and map UCIe command and data timing signals for the UCIe PHY interface to DFI command and data timing signals.

The first example apparatus further comprising any of the previous examples, including the interface logic to: encode the UCIe signals for transmission over the transmit channel of the UCIe interconnect to a memory chip in a same package as the SoC; and decode the UCIe signals from the receive channel of the UCIe interconnect from the memory chip in the same package as the SoC.

The first example apparatus further comprising any of the previous examples, including the interface logic to: encode cyclic redundancy check (CRC) or error checking and correcting (ECC) signals for the UCIe signals for transmission over a command channel of the UCIe interconnect; and decode the CRC signals or ECC signals for the UCIe signals from the command channel of the UCIe interconnect.

The first example apparatus further comprising any of the previous examples, including the interface logic to: encode the UCIe signals for transmission over multiple transmit channels of the UCIe interconnect; and decode the UCIe signals from multiple receive channels of the UCIe interconnect.

The first example apparatus further comprising any of the previous examples, including a second (SoC) comprising a memory controller and a second UCIe interconnect, the second UCIe interconnect comprising second interface logic to manage transport of data over the second UCIe interconnect in a transmit mode and a receive mode, the second interface logic to: encode UCIe signals for transmission over a transmit channel of the second UCIe interconnect to a second memory chip in a same package as the second SoC; and decode the UCIe signals from a receive channel of the second UCIe interconnect from the second memory chip in the same package as the second SoC.

The first example apparatus further comprising any of the previous examples, including the interface logic to: encode UCIe signals for transmission over the transmit channel of the UCIe interconnect through buffered logic of a first memory chip in a same package as the SoC for a second memory chip in the same package as the SoC and the first memory chip; and decode the UCIe signals from a receive channel of the UCIe interconnect from the second memory chip through the buffered logic of the first memory chip.

The first example apparatus further comprising any of the previous examples, including the SoC having a top side and a bottom side, the bottom side to comprise a set of bumps corresponding to a set of physical layer blocks, each bump to have a specific position on the bottom side according to a bump definition, each bump corresponding to each physical layer block.

The first example apparatus further comprising any of the previous examples, including a substrate with a set of reference channels to provide a conductive path between the SoC and a memory device on memory chip, the set of reference channels embedded in the substrate, the SoC and the memory chip mounted on the substrate to form a standard package.

The first example apparatus further comprising any of the previous examples, including a substrate with an embedded silicon bridge, the silicon bridge having a set of reference channels to provide a conductive path between the SoC and a memory device on a memory chip, the SoC and the memory chip mounted on the substrate to form an advanced package.

The first example apparatus further comprising any of the previous examples, including a substrate, an interposer mounted on the substrate, the interposer having a set of reference channels to provide a conductive path between the SoC and a memory device on a memory chip, the SoC and the memory chip mounted on the interposer to form an advanced package.

The first example apparatus further comprising any of the previous examples, including a substrate, an interposer mounted on the substrate, the interposer having a silicon bridge with a set of reference channels to provide a conductive path between the SoC and a memory device on a memory chip, the SoC and the memory chip mounted on the interposer to form an advanced package.

The first example apparatus further comprising any of the previous examples, including where the UCIe interface for the UCIe interconnect is defined by a universal chiplet interconnect express (UCIe) specification.

A second example apparatus, comprising: a system-on-a-chip (SoC) fabric comprising a universal chiplet interconnect express (UCIe) interconnect, the UCIe interconnect comprising interface logic to manage transport of data over the UCIe interconnect in a transmit mode, the interface logic to: decode memory signals from over the SoC fabric; map the memory signals to UCIe signals; and encode the UCIe signals for transmission over an asymmetric link of the UCIe interconnect.

The second example apparatus further comprising any of the previous examples, including the interface logic to manage transport of data over the UCIe interconnect in a receive mode, the interface logic to: decode UCIe signals from the asymmetric link of the UCIe interconnect; map the UCIe signals to memory signals; and encode the memory signals for transmission over the SoC fabric.

The second example apparatus further comprising any of the previous examples, including where the memory signals are compute express link (CXL) memory signals.

The second example apparatus further comprising any of the previous examples, including where the memory signals compute express link (CXL) signals, and the interface logic to: map CXL command and data timing signals for a CXL memory interface to UCIe command and data timing signals for a UCIe adapter and physical layer (PHY) interface; and map UCIe command and data timing signals for the UCIe adapter and PHY interface to CXL command and data timing signals for the CXL memory interface.

The second example apparatus further comprising any of the previous examples, including the interface logic to: encode the UCIe signals for transmission over the asymmetric link of the UCIe interconnect to a memory chip in a same package as the SoC fabric; and decode the UCIe signals from the asymmetric link of the UCIe interconnect from the memory chip in the same package as the SoC fabric.

The second example apparatus further comprising any of the previous examples, including the interface logic to: encode cyclic redundancy check (CRC) or error checking and correcting (ECC) signals for the UCIe signals for transmission over the asymmetric link of the UCIe interconnect; and decode the CRC signals or ECC signals for the UCIe signals from the asymmetric link of the UCIe interconnect.

The second example apparatus further comprising any of the previous examples, including the interface logic to: encode the UCIe signals for transmission over multiple transmit channels of the asymmetric link of the UCIe interconnect; and decode the UCIe signals from multiple receive channels of the asymmetric link of the UCIe interconnect.

The second example apparatus further comprising any of the previous examples, including the interface logic to: encode compute express link (CXL) input/output (I/O) signals for the UCIe signals for transmission over the asymmetric link of the UCIe interconnect; and decode the CXL I/O signals for the UCIe signals from the asymmetric link of the UCIe interconnect.

A first example method, comprising: decoding memory signals from a memory controller of a system-on-a-chip (SoC) comprising the memory controller and a universal chiplet interconnect express (UCIe) interconnect, the UCIe interconnect comprising interface logic to manage transport of data over the UCIe interconnect in a transmit mode;
   mapping the memory signals to UCIe signals; and encoding the UCIe signals for transmission over a transmit channel of the UCIe interconnect.

The first example method further comprising any of the previous examples, including decoding UCIe signals from a receive channel of the UCIe interconnect by the interface logic in a receive mode; mapping the UCIe signals to memory signals; and encoding the memory signals for transmission to the memory controller.

The first example method further comprising any of the previous examples, including where the memory signals are double data rate (DDR) memory signals or high bandwidth memory (HBM) memory signals.

The first example method further comprising any of the previous examples, including where the memory signals comprise double data rate (DDR) physical layer (PHY) interface (DFI) signals, and the interface logic to: mapping DFI command and data timing signals to UCIe command and data timing signals for a UCIe PHY interface; and mapping UCIe command and data timing signals for the UCIe PHY interface to DFI command and data timing signals.

The first example method further comprising any of the previous examples, including the interface logic to: encoding the UCIe signals for transmission over the transmit channel of the UCIe interconnect to a memory chip in a same package as the SoC;
   and decoding the UCIe signals from the receive channel of the UCIe interconnect from the memory chip in the same package as the SoC.

The first example method further comprising any of the previous examples, including encoding cyclic redundancy check (CRC) or error checking and correcting (ECC) signals for the UCIe signals for transmission over a command channel of the UCIe interconnect; and decoding the CRC signals or ECC signals for the UCIe signals from the command channel of the UCIe interconnect.

The first example method further comprising any of the previous examples, including encoding the UCIe signals for transmission over multiple transmit channels of the UCIe interconnect; and decoding the UCIe signals from multiple receive channels of the UCIe interconnect.

The first example method further comprising any of the previous examples, including encoding UCIe signals for transmission over a transmit channel of a second UCIe interconnect to a second memory chip in a same package as a second SoC; and decoding the UCIe signals from a receive channel of the second UCIe interconnect from the second memory chip in the same package as the second SoC.

The first example method further comprising any of the previous examples, including encoding UCIe signals for transmission over the transmit channel of the UCIe interconnect through buffered logic of a first memory chip in a same package as the SoC for a second memory chip in the same package as the SoC and the first memory chip; and decoding the UCIe signals from a receive channel of the UCIe interconnect from the second memory chip through the buffered logic of the first memory chip.

A second example method, comprising: decoding memory signals from a system-on-a-chip (SoC) fabric comprising a universal chiplet interconnect express (UCIe) interconnect, the UCIe interconnect comprising interface logic to manage transport of data over the UCIe interconnect in a transmit mode; mapping the memory signals to UCIe signals; and encoding the UCIe signals for transmission over an asymmetric link of the UCIe interconnect.

The second example method further comprising any of the previous examples, including the interface logic to manage transport of data over the UCIe interconnect in a receive mode, the interface logic to: decoding UCIe signals from the asymmetric link of the UCIe interconnect; mapping the UCIe signals to memory signals; and encoding the memory signals for transmission over the SoC fabric.

The second example method further comprising any of the previous examples, including where the memory signals are compute express link (CXL) memory signals.

The second example method further comprising any of the previous examples, including where the memory signals are compute express link (CXL) signals, and mapping CXL command and data timing signals for a CXL memory interface to UCIe command and data timing signals for a UCIe adapter and physical layer (PHY) interface; and mapping UCIe command and data timing signals for the UCIe adapter and PHY interface to CXL command and data timing signals for the CXL memory interface.

The second example method further comprising any of the previous examples, including encoding the UCIe signals for transmission over the asymmetric link of the UCIe interconnect to a memory chip in a same package as the SoC fabric; and decoding the UCIe signals from the asymmetric link of the UCIe interconnect from the memory chip in the same package as the SoC fabric.

The second example method further comprising any of the previous examples, including encoding cyclic redundancy check (CRC) or error checking and correcting (ECC) signals for the UCIe signals for transmission over the asymmetric link of the UCIe interconnect; and decoding the CRC signals or ECC signals for the UCIe signals from the asymmetric link of the UCIe interconnect.

The second example method further comprising any of the previous examples, including encoding the UCIe signals for transmission over multiple transmit channels of the asymmetric link of the UCIe interconnect; and decoding the UCIe signals from multiple receive channels of the asymmetric link of the UCIe interconnect.

The second example method further comprising any of the previous examples, including encoding compute express link (CXL) input/output (I/O) signals for the UCIe signals for transmission over the asymmetric link of the UCIe interconnect; and decoding the CXL I/O signals for the UCIe signals from the asymmetric link of the UCIe interconnect.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
    a system-on-a-chip (SoC) comprising an integrated circuit on a semiconductor die, the SoC comprising a memory controller and a universal chiplet interconnect express (UCIe) interface for a UCIe interconnect, the UCIe interface comprising interface logic to manage transport of data over the UCIe interconnect in a transmit mode, the interface logic to:
    decode memory signals from the memory controller;
    map the memory signals to UCIe signals; and
    encode the UCIe signals for transmission over a transmit channel of the UCIe interconnect.

2. The apparatus of claim 1, the interface logic to manage transport of data over the UCIe interconnect in a receive mode, the interface logic to:
    decode UCIe signals from a receive channel of the UCIe interconnect;
    map the UCIe signals to memory signals; and
    encode the memory signals for transmission to the memory controller.

3. The apparatus of claim 1, wherein the memory signals are double data rate (DDR) memory signals or high bandwidth memory (HBM) memory signals.

4. The apparatus of claim 1, wherein the memory signals comprise double data rate (DDR) physical layer (PHY) interface (DFI) signals, and the interface logic to:
    map DFI command and data timing signals to UCIe command and data timing signals for a UCIe PHY interface; and map UCIe command and data timing signals for the UCIe PHY interface to DFI command and data timing signals.

5. The apparatus of claim 1, the interface logic to:
encode the UCIe signals for transmission over the transmit channel of the UCIe interconnect to a memory chip in a same package as the SoC; and
decode the UCIe signals from the receive channel of the UCIe interconnect from the memory chip in the same package as the SoC.

6. The apparatus of claim 1, the interface logic to:
encode cyclic redundancy check (CRC) or error checking and correcting (ECC) signals for the UCIe signals for transmission over a command channel of the UCIe interconnect; and
decode the CRC signals or ECC signals for the UCIe signals from the command channel of the UCIe interconnect.

7. The apparatus of claim 1, the interface logic to:
encode the UCIe signals for transmission over multiple transmit channels of the UCIe interconnect; and
decode the UCIe signals from multiple receive channels of the UCIe interconnect.

8. The apparatus of claim 1, comprising:
a second (SoC) comprising a memory controller and a second UCIe interconnect, the second UCIe interconnect comprising second interface logic to manage transport of data over the second UCIe interconnect in a transmit mode and a receive mode, the second interface logic to:
encode UCIe signals for transmission over a transmit channel of the second UCIe interconnect to a second memory chip in a same package as the second SoC; and
decode the UCIe signals from a receive channel of the second UCIe interconnect from the second memory chip in the same package as the second SoC.

9. The apparatus of claim 1, the interface logic to:
encode UCIe signals for transmission over the transmit channel of the UCIe interconnect through buffered logic of a first memory chip in a same package as the SoC for a second memory chip in the same package as the SoC and the first memory chip; and
decode the UCIe signals from a receive channel of the UCIe interconnect from the second memory chip through the buffered logic of the first memory chip.

10. An apparatus, comprising:
a system-on-a-chip (SoC) fabric of a SoC comprising an integrated circuit on a semiconductor die, the SoC fabric comprising a universal chiplet interconnect express (UCIe) interface for a UCIe interconnect, the UCIe interface comprising interface logic to manage transport of data over the UCIe interconnect in a transmit mode, the interface logic to:
decode memory signals from over the SoC fabric;
map the memory signals to UCIe signals; and
encode the UCIe signals for transmission over an asymmetric link of the UCIe interconnect.

11. The apparatus of claim 10, the interface logic to manage transport of data over the UCIe interconnect in a receive mode, the interface logic to:
decode UCIe signals from the asymmetric link of the UCIe interconnect;
map the UCIe signals to memory signals; and
encode the memory signals for transmission over the SoC fabric.

12. The apparatus of claim 10, wherein the memory signals are compute express link (CXL) memory signals.

13. The apparatus of claim 10, wherein the memory signals compute express link (CXL) signals, and the interface logic to:
map CXL command and data timing signals for a CXL memory interface to UCIe command and data timing signals for a UCIe adapter and physical layer (PHY) interface; and
map UCIe command and data timing signals for the UCIe adapter and PHY interface to CXL command and data timing signals for the CXL memory interface.

14. The apparatus of claim 10, the interface logic to:
encode the UCIe signals for transmission over the asymmetric link of the UCIe interconnect to a memory chip in a same package as the SoC fabric; and
decode the UCIe signals from the asymmetric link of the UCIe interconnect from the memory chip in the same package as the SoC fabric.

15. The apparatus of claim 10, the interface logic to:
encode cyclic redundancy check (CRC) or error checking and correcting (ECC) signals for the UCIe signals for transmission over the asymmetric link of the UCIe interconnect; and
decode the CRC signals or ECC signals for the UCIe signals from the asymmetric link of the UCIe interconnect.

16. A method, comprising:
decoding memory signals from a memory controller of a system-on-a-chip (SoC) comprising an integrated circuit on a semiconductor die, the SoC comprising the memory controller and a universal chiplet interconnect express (UCIe) interface for a UCIe interconnect, the UCIe interface comprising interface logic to manage transport of data over the UCIe interconnect in a transmit mode;
mapping the memory signals to UCIe signals; and
encoding the UCIe signals for transmission over a transmit channel of the UCIe interconnect.

17. The method of claim 16, comprising:
decoding UCIe signals from a receive channel of the UCIe interconnect by the interface logic in a receive mode;
mapping the UCIe signals to memory signals; and
encoding the memory signals for transmission to the memory controller.

18. The method of claim 16, wherein the memory signals are double data rate (DDR) memory signals or high bandwidth memory (HBM) memory signals.

19. The method of claim 16, wherein the memory signals comprise double data rate (DDR) physical layer (PHY) interface (DFI) signals, and the interface logic to:
mapping DFI command and data timing signals to UCIe command and data timing signals for a UCIe PHY interface; and
mapping UCIe command and data timing signals for the UCIe PHY interface to DFI command and data timing signals.

20. The method of claim 16, comprising:
encoding the UCIe signals for transmission over the transmit channel of the UCIe interconnect to a memory chip in a same package as the SoC; and
decoding the UCIe signals from the receive channel of the UCIe interconnect from the memory chip in the same package as the SoC.

\* \* \* \* \*